United States Patent
Yamamoto

[19]

[11] Patent Number: 5,973,474
[45] Date of Patent: Oct. 26, 1999

[54] VECTOR CONTROL APPARATUS METHOD FOR INDUCTION MOTOR USING MAGNETIC FLUX OBSERVER OF FULL ORDER

[75] Inventor: Yasuhiro Yamamoto, Aichi, Japan

[73] Assignee: Kabushiki Kaisha Meidensha, Tokyo, Japan

[21] Appl. No.: 09/154,473

[22] Filed: Sep. 16, 1998

[30] Foreign Application Priority Data

Dec. 8, 1997 [JP] Japan ..................................... 9-336223
Jan. 14, 1998 [JP] Japan ................................. 10-005284

[51] Int. Cl.⁶ .............................. H02P 21/00; H02P 7/36
[52] U.S. Cl. ......................... 318/801; 318/805; 318/804
[58] Field of Search .................................. 318/798–812, 318/432, 433

[56] References Cited

U.S. PATENT DOCUMENTS 5,270,498 12/1993 Tanahashi ............................... 187/293
5,341,081 8/1994 Yamada .................................. 318/800
5,446,360 8/1995 Son et al. ............................... 318/727

FOREIGN PATENT DOCUMENTS 0 790 701  8/1997  European Pat. Off. .

OTHER PUBLICATIONS

Kubota et al., "Adaptive Flux Observer of Induction Motor and its Stability" *T.IEE Japan* vol. 111–D No. 3 pp. 188–1195 (1991).

Hashimoto et al., "Performance of Torque Control of Induction Motor Using State Observer" *Institute of Industrial Science* pp. 349–354 (1987).

Kubota et al., "Direct Field Oriented Control of Induction Motor without Speed Sensors Using Adaptive Flux Observer" *T.IEE Japan* vol. 111–D, No. 11, pp. 954–959 (1991).

Yang et al., "Hyperstability of the Full Order Adaptive Observer for Vector Controlled–Induction Motor Drive without Speed–Sensor" *T.IEE Japan* vol. 112–D, No. 11, pp. 1046–1055 (1992).

*Primary Examiner*—Bentsu Ro
*Attorney, Agent, or Firm*—Foley & Lardner

[57] ABSTRACT

In a vector control apparatus and method for an induction motor, a magnetic flux observer of a full order is provided for receiving a primary voltage vector ($v_1$) and a primary current vector ($i_1$) and for generating a vector related to an estimated secondary magnetic flux component to be supplied to a current command calculating section and related to an estimate rotation phase of a rotary coordinate system to be supplied to a current controlling section based on the primary voltage vector and the primary current vector, the magnetic flux observer of the full order having a plurality of coefficients expressed in circuit constants of a T-I type equivalent circuit of the induction motor.

12 Claims, 21 Drawing Sheets

VECTOR CONTROL APPARATUS METHOD FOR INDUCTION MOTOR USING MAGNETIC FLUX OBSERVER OF FULL ORDER

BACKGROUND OF THE INVENTION a) Field of the Invention

The present invention relates to vector control apparatus and method for controlling torque and speed of an induction motor through a vector control type inverter in which a magnetic flux observer of a full order is expressed in a state equation and has a plurality of coefficients expressed in circuit constants in a T-I type equivalent circuit to the induction motor.

b) Description of the Related Art

There are some kinds of vector control methods for an induction motor. There is a certain kind of vector control method for the induction motor in which a secondary magnetic flux of the induction motor is estimated using a flux observer and the induction motor is controlled on the basis of the estimated magnetic flux.

In addition, Japanese technical papers describing the application of the full order magnetic flux observer so as to add a compensation for a temperature variation of the secondary resistance of the induction motor and/or to achieve a speed control of the induction motor without use of a speed sensor.

That is to say, there are four published papers listed below:

1) a first Literature (Literature 1); "Adaptive Flux Observer of Induction Motor and its Stability" in T.IEE Japan Volume 111-D, No. 3 published on Mar. 3, 1991 and authored by Hisao Kubota and Kouki Matuse.
2) a second Literature (Literature 2); "Performance of a Torque Control for Induction Motor Using State Observer" published on 1987 in National Meeting of Industrial Application Department on Japan Electrical Society and authored by Hideki Hashimoto, Yukou Ohno, Seiji Kondo, and Fumio Harashima.
3) a third literature (Literature 3); "Direct Field Oriented Control of Induction Motor Without Speed Sensors using Adaptive Flux Observer" published on November of 1991 in a paper D of a Japan Electrical Engineering Society, Volume 111, No. 11 and authored by Hisao Kubota, Masanori Ozaki, and Kouki Matsuse.
4) a fourth literature (Literature 4); "Hyperstability of the Full Order Adaptive Observer for Vector Controlled-Induction Motor Drive Without Speed Sensor" in a paper D of the Japan Electric Engineering Society published on January 1992, Volume 112, No. 11 and authored by Gung Yang and Tung-Hai Chin.

Equations concerned with the full order magnetic flux observer are known from the above-listed literatures 1 and 2.

The literature 1 recites that the observer is constituted by the equations in a time-continuous system to which a numerical value integration such as an Euler method is applied.

On the other hand, the literature 2 recites that the observer is constituted by equations in a time-discrete system using a time-discrete model to reduce computation errors.

A general concept on the equation in the time-continuous system recited in the literature 1 will briefly be described below.

A state equation on stator coordinates of the induction motor is given by an equation (1) in TABLE 1.

In the TABLE 1, $i_1$ denotes a primary current of the induction motor, $v_1$ denotes a primary voltage, and $\lambda_1$ denotes a secondary magnetic flux.

Furthermore, TABLE 2 shows respective coefficients (2-1) through (2-11) recited in the equation (1).

In the equation (1), the current, voltage, and magnetic constants are two-axis components but are expressed in terms of vectors to simplify the expressions of equation. Actually, the primary current, the primary voltage, and secondary magnetic flux mean two-axis components of $\alpha$-$\beta$.

That is to say, the primary current, the primary voltage, and the secondary magnetic flux are expressed in three equations (3) in TABLE 3.

Constants (circuit constants) in the induction motor are represented as follows:

$R_1$: Primary Voltage;
$R_2$: Secondary Resistance;
$L_1$: Primary Inductance;
$L_2$: Secondary Resistance; and
M: Mutual (Exciting) Inductance in a T type equivalent circuit to the induction motor;

The magnetic flux observer of the full order recited in the literature 1 is expressed in the case where a pole arrangement of the observer is set to be k times as large as the pole arrangement hat the induction motor inherently has.

On the other hand, the magnetic flux observer provided in the vector control method can also be constituted by an equation (4) in TABLE 4. An estimation variable is represented by a superscript of ^.

In addition, feedback gains of the observer are expressed in equations (5-1), (5-2), (5-3), (5-4), and (5-5) in TABLE 5.

Utilizing the magnetic flux observer of the full order, induction motor drives without a rotor speed sensor such as a rotary encoder has been proposed in the literatures 3 and 4. In each of the literatures 3 and 4, in order to estimate the rotor speed, an adaptive control for the rotor speed has been carried out using the following speed estimation equations.

That is to say, error components between a model current and an actual current such as an excitation current or a torque current are defined in equations (6-1) and (6-2) in TABLE 6.

It is noted that the model current is a current flowing through a Model Reference Adaptive System (MRAS) recited in the literature 4 and a superscript of ^denotes an estimated value in the MRAS side.

Next, the rotor speed $\omega r$ is estimated from an equation (7) in TABLE 7 using the magnetic flux and error current components.

SUMMARY OF THE INVENTION

However, in the state equations (1) and (4) each constituting the magnetic flux observer of the full order, constants in a T type equivalent equation has been used as the constants in the induction motor.

When the rotor speed of an actual induction motor is controlled using the vector control method, a separation between a primary leakage current and a secondary leakage current cannot be made. Hence, values on the secondary resistance $L_2$ and mutual (exciting) inductance M cannot be determined.

It is therefore necessary to alter the constants in the above-described equations (1) and (4) into those in another equivalent circuit.

If the constants in a T-I type equivalent circuit could be represented, those constants could easily be measured and would easily correspond to physical quantities such as magnetic flux and torque current and would be convenient.

Next, in the equations (1) and (4), the secondary magnetic flux has been used as a second-order variable. However, in the vector control method, the division of magnetic flux by the mutual inductance M is often used. This division corresponds to an excitation current so that it is convenient in the vector control method.

In the vector control method, magnetic flux and currents on rotary coordinates are often given as commands. It is convenient for the estimated magnetic flux in the magnetic flux observer to be enabled to be converted into the rotary coordinates.

The full order magnetic flux observer recited in each literature ignores an iron loss component although the induction motor includes the iron loss current component. Hence, an error occurs in the estimated magnetic flux component and/or rotor speed in the vector control method without use of the rotor speed sensor.

It is therefore an object of the present invention to provide improved vector control apparatus and method for an induction motor in which at least a magnetic flux observer of a full order whose elements in state equations can be represented by the constants in the T-I type equivalent circuit.

According to one aspect of the present invention, there is provided with a vector control apparatus for an induction motor comprising: a) a current command calculating section for receiving a torque command (T*), a magnetic flux command ($\lambda_2$*), and an estimated secondary magnetic flux component($|\hat{\lambda}_2/M|$) and for outputting a primary current command vector ($i_1^{*e}$) according to the torque command, the magnetic flux command, and the estimated secondary magnetic flux component; b) a current controlling section for receiving the primary current command vector from the current command calculating section, for detecting a primary current vector ($i_1$) flowing through the induction motor, for generating a primary voltage vector ($v_1$) according to a deviation between the primary current command vector and the primacy current vector, and for outputting the primary current vector to the induction motor according to the generated primacy voltage vector; and, c) a magnetic flux observer of a full order for receiving the primary voltage vector and the primary current vector from the current controlling section and for generating a vector variable ($\hat{\lambda}_2$ or $\hat{\lambda}_2/M$) related to the estimated secondary magnetic flux component to be supplied to the current command calculating section and related to an estimated rotation phase ($\hat{\theta}$) of a rotary coordinate system to be supplied to the current controlling section based on the primary voltage vector and the primary current vector, the magnetic flux observer of the full order having a plurality of coefficients expressed in circuit constants of a T-I type equivalent circuit of the induction motor.

According to another aspect of the present invention, there is provided with a vector control method for an induction motor, the vector control method comprising the steps of: a) receiving a torque command (T*), a magnetic flux command ($\lambda_2$*), and an estimated secondary magnetic flux component($|\hat{\lambda}_2/M|$); b) outputting a primary current command vector ($i_1^{*e}$) according to the torque command, the magnetic flux command, and the estimated secondary magnetic flux component; c) receiving the primary current command vector; d) detecting a primary current vector ($i_1$) flowing through the induction motor, for generating a primary voltage vector ($v_1$) according to a deviation between the primary current command vector and the primacy current vector; e) outputting the primary current vector to the induction motor according to the generated primacy voltage vector; f) providing a magnetic flux observer of a full order for receiving the primary voltage vector and the primary current vector and for generating a vector variable ($\hat{\lambda}_2$ or $\hat{\lambda}_2/M$) related to the estimated secondary magnetic flux component and related to an estimated rotation phase ($\hat{\theta}$) of a rotary coordinate system based on the primary voltage vector and the primary current vector, the magnetic flux observer of the full order having a plurality of coefficients expressed in circuit constants of a T-I type equivalent circuit of the induction motor.

This summary of the invention does not necessarily describe all necessary features so that the invention may also be a sub-combination of these described features.

BEST MODE FOR CARRYING OUT THE INVENTION

Reference will hereinafter be made to the drawings in order to facilitate a better understanding of the present invention.

(First Embodiment)

Figure 1:
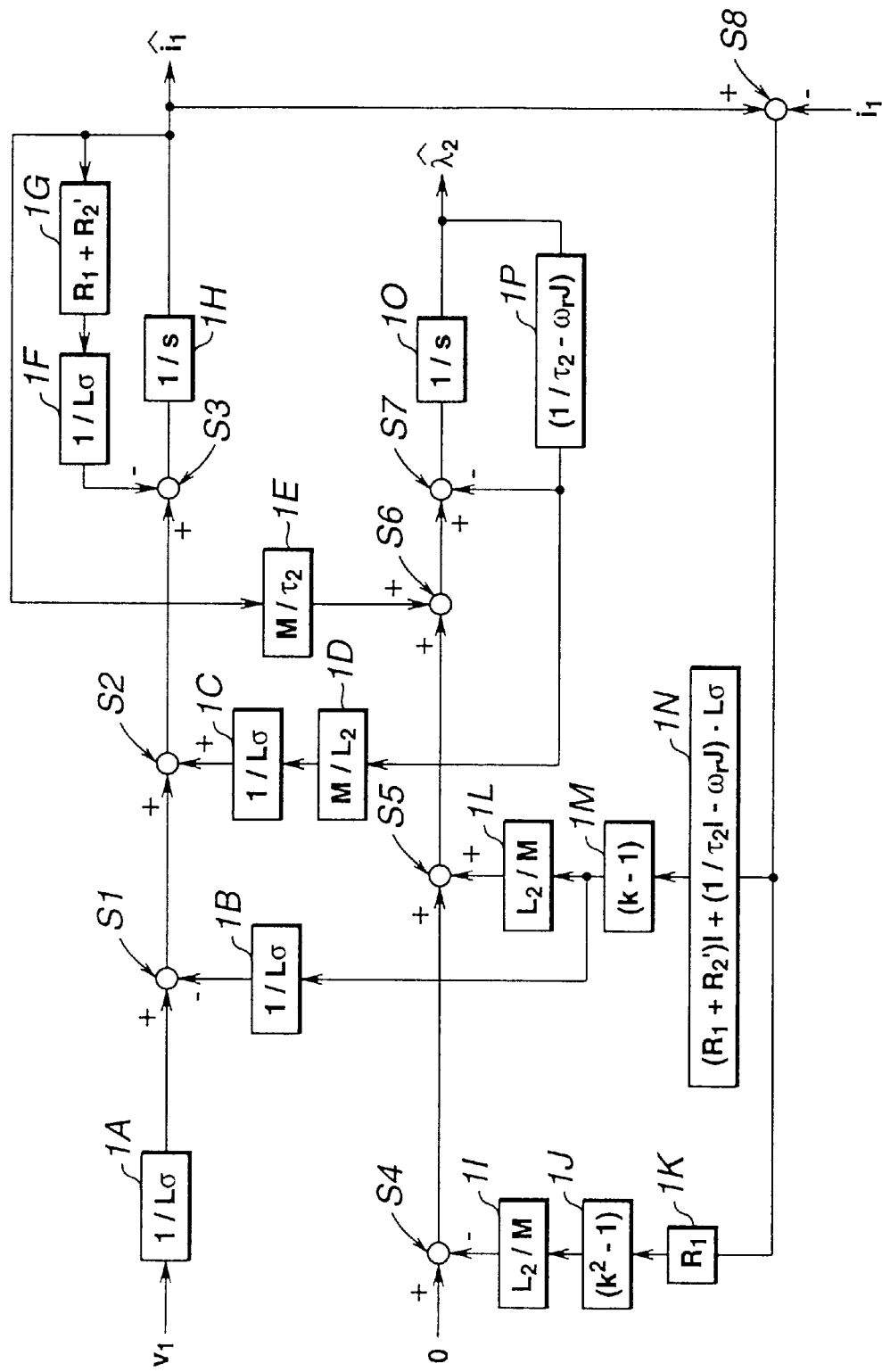
FIG. 1 is a circuit block diagram of a first preferred embodiment of a vector control apparatus for an induction motor especially representing a magnetic flux observer of a full order in the first embodiment according to the present invention.

FIG. 1 shows a first preferred embodiment of a vector control apparatus for an induction motor according to the present invention.

That is to say, FIG. 1 shows a block diagram of a magnetic flux observer using constants in a T-I type equivalent circuit of the induction motor. It is noted that the T-I type equivalent circuit is exemplified by an European Patent Application Publication No. EP 0 790 701 A2 which corresponds to a U.S. patent application Ser. No. 08/800,171 which has already been allowed (, the disclosure of which is herein incorporated by reference).

In the first embodiment, in order to replace each coefficient in each of state equations (1) and (4) recited in TABLE 1 and TABLE 4 with the constants in the constants in the T-I type equivalent circuit, conversion equations (8-1), (8-2), (8-3), and (8-4) in TABLE 8 are substituted into each of the state equations (1) and (4) to derive equations (9-1), (9-2), (9-3), (9-4), (9-5), (9-6), and (9-7) in TABLE 9.

Next, TABLE 10 shows feedback terms $g_1$, $g_2$, $g_3$, and $g_4$ of the observer represented by the constants of the induction motor T-I type equivalent circuit.

Hence, using the state equations of (1) and (4) in which the constants in the T-I equivalent circuit are adopted and the equations of (9-1) through (9-7) in which the constants in the T-I type equivalent circuit are adopted, the magnetic observer of the full order in the first embodiment shown in FIG. 1 is achieved.

In FIG. 1, S1 denotes a first subtractor connected between a first coefficient block 1A of v1 by $1/L\sigma$ and a second coefficient block 1B by $1/L\sigma$, S2 denotes a first adder connected between the first subtractor S1 and a third coefficient block 1C by $1/L\sigma$, S3 denotes a second subtractor connected between the first adder S2 and a fourth coefficient block 1F by $1/L\sigma$, S4 denotes a third subtractor connected between 0 and a fifth coefficient block 1I by $L_2/M$, S5 denotes a second adder connected between the third subtractor S4 and a sixth coefficient block 1L by $L_2/M$, S6 denotes a third adder connected between the second adder S5 and a seventh coefficient block 1E by $M/\tau_2$, S7 denotes a fourth subtractor connected between the third adder S6 and an eighth coefficient block 1P by $(1/\tau_2-\omega_r J)$, S8 denotes a fifth subtractor connected between an estimated model current $\hat{i}_1$ and an actual primary current $i_1$. In addition, the second coefficient block 1B is connected to a ninth coefficient block 1M, the third coefficient block 1C is connected to a tenth coefficient block 1D, the fourth coefficient block 1F is connected to an eleventh coefficient block 1G by $(R_1+R_2')$, a first integrator 1H is connected to the second subtractor S3, a twelfth coefficient block 1E is connected between the first integrator 1H and the third adder S6, the eleventh coefficient block 1G is connected to the first integrator 1H, the fifth coefficient block 1I is connected to a thirteenth coefficient block 1J by $(k^2-1)$, the thirteenth coefficient block 1J is connected to a fourteenth coefficient block 1K, the fourteenth coefficient block 1K is connected to the fifth subtractor S8, the ninth coefficient block 1M is connected to a fifteenth coefficient block 1N by $\{(R_1+R_2')I+(1/\tau_2 I-\omega_r J)\} L\sigma$, the fifteenth coefficient block 1N is connected to the fifth subtractor S8, the tenth coefficient block 1D is connected to the eighth coefficient block 1P, and a second integrator 10 is connected between the fourth subtractor S7 and an estimated secondary magnetic flux $\hat{\lambda}_2$.

Consequently, it becomes unnecessary to separate between the primary leakage inductance and the secondary leakage inductance so that the apparatus for controlling the torque and speed of the induction motor in terms of vector control method in which the constants measured from the actual induction motor to be controlled are directly used can be achieved.

(Second Embodiment)

Figure 2:
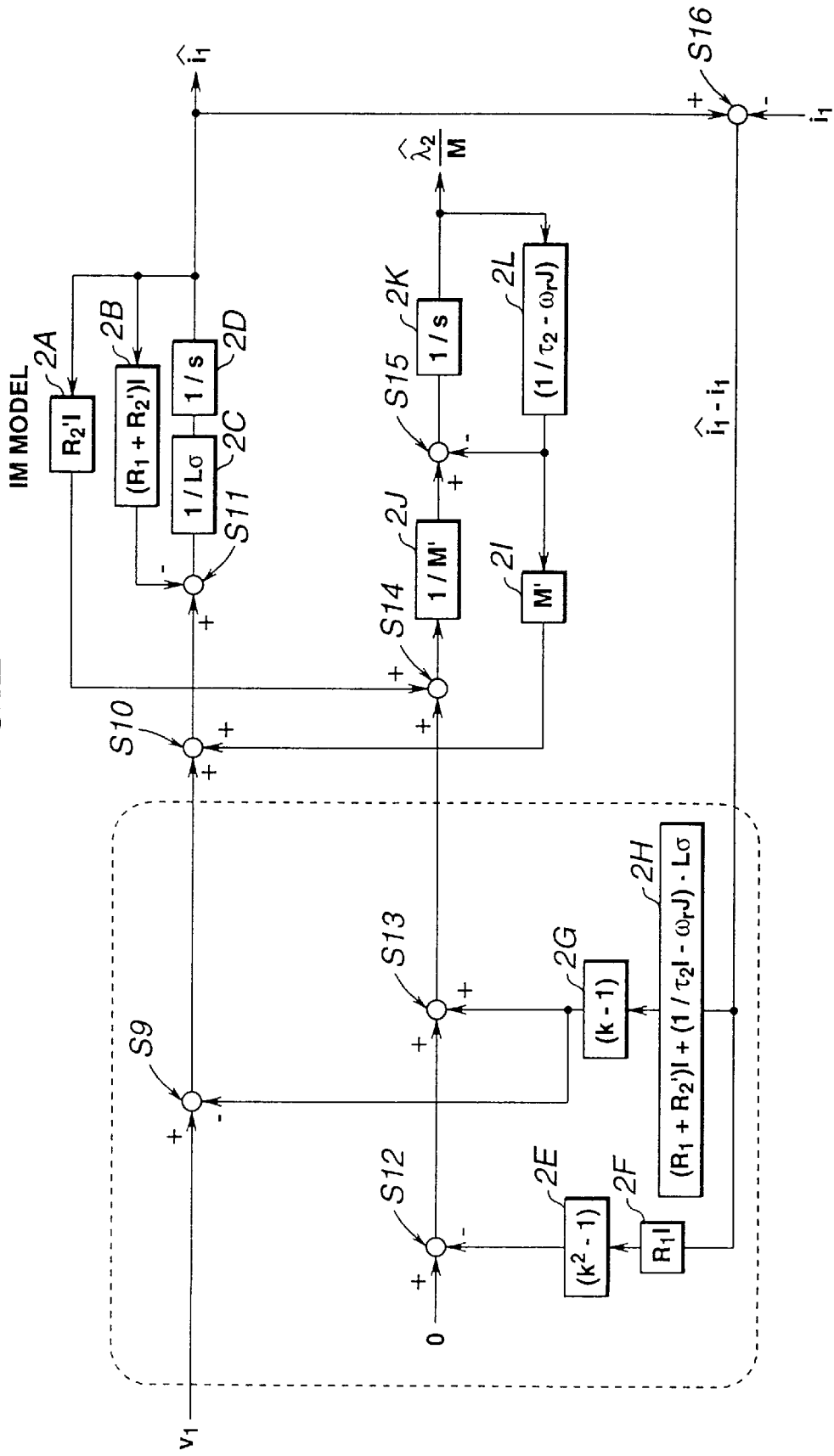
FIG. 2 is a circuit block diagram of a second preferred embodiment of the induction motor vector control apparatus especially representing a magnetic flux observer of the full order in the second preferred embodiment.

FIG. 2 shows a second preferred embodiment of the vector apparatus for the induction motor according to the present invention.

That is to say, FIG. 2 shows a circuit block diagram of the magnetic flux observer of the full order in the second embodiment whose secondary magnetic flux $\lambda_2$ is changed to the secondary current $i_2$.

In order to alter the secondary magnetic flux into the excitation current component ($\lambda_2/M$), the elements in the second column of the state equation (4) recited in TABLE 4 are multiplied by M and those in the second column are multiplied by 1/M to derive an equation (11-1) of TABLE 11. If the equation (11-1) of TABLE 11 is arranged, an equation of (11-2) of TABLE 11 can be derived.

In addition, the feedback terms of $g_1$ through $g_4$ of the observer are derived as equations (21-1), (12-2), (21-3), and (12-4) in TABLE 12.

Hence, the equation (11-2) of TABLE 11 constitutes the magnetic flux observer of the full order shown in FIG. 2 when $1/L\sigma$ and $1/M'$ are arranged immediately before integration terms of the equation (11-2).

In FIG. 2, S9 denotes a first subtractor connected between the input voltage value $v_1$ and a first coefficient block 2G by $(k-1)$, S10 denotes a first adder connected between the first subtractor S9 and a second coefficient block 2I, S11 denotes a second subtractor connected between the first adder S11 and a third coefficient block 2B by $(R_1+R_2')I$, S12 denotes a third subtractor connected between the third subtractor S12 and the first coefficient block 2G, S14 denotes a third adder connected between the second adder S13 and a fifth coefficient block 2A by $R_2'I$, S15 denotes a fourth subtractor connected between a sixth coefficient block 2J and a seventh coefficient block 2L, and S16 denotes a fifth subtractor connected between $\hat{i}_1$ output end and $i_1$ input end.

In addition, in FIG. 2, an eighth coefficient block 2F is connected between the fourth coefficient block 2E and the fifth subtractor S16, a ninth coefficient block 2H is connected between the first coefficient block 2G and the fifth subtractor S16, a twelfth coefficient block 2I is connected between the first adder S10 and the seventh coefficient block 2L, a first integrator 2k is connected between the fourth subtractor S15 and an $\hat{\lambda}_2/M$ output end, an eleventh coefficient block 2C is connected between the first adder S11 and a second integrator 2D, a twelfth coefficient block 2B is connected between the second subtractor S11 and the second integrator 2D, and the fifth coefficient block 2A is connected between the third adder S14 and the second integrator 2D.

In FIG. 2, a portion enclosed by a dot line indicates the feedback term of the magnetic flux observer and a portion enclosing the fifth coefficient block 2A, the second subtractor S11, the twelfth coefficient block 2B, the eleventh coefficient block 2C, and the second integrator 2D indicates an induction motor model.

Hence, the estimated results of $\hat{i}_1$ and $\hat{\lambda}_2/M$ are obtained and are used to perform the vector control for the induction motor as variables. The induction motor drives can easily be achieved.

(Third Embodiment)

Figure 3:
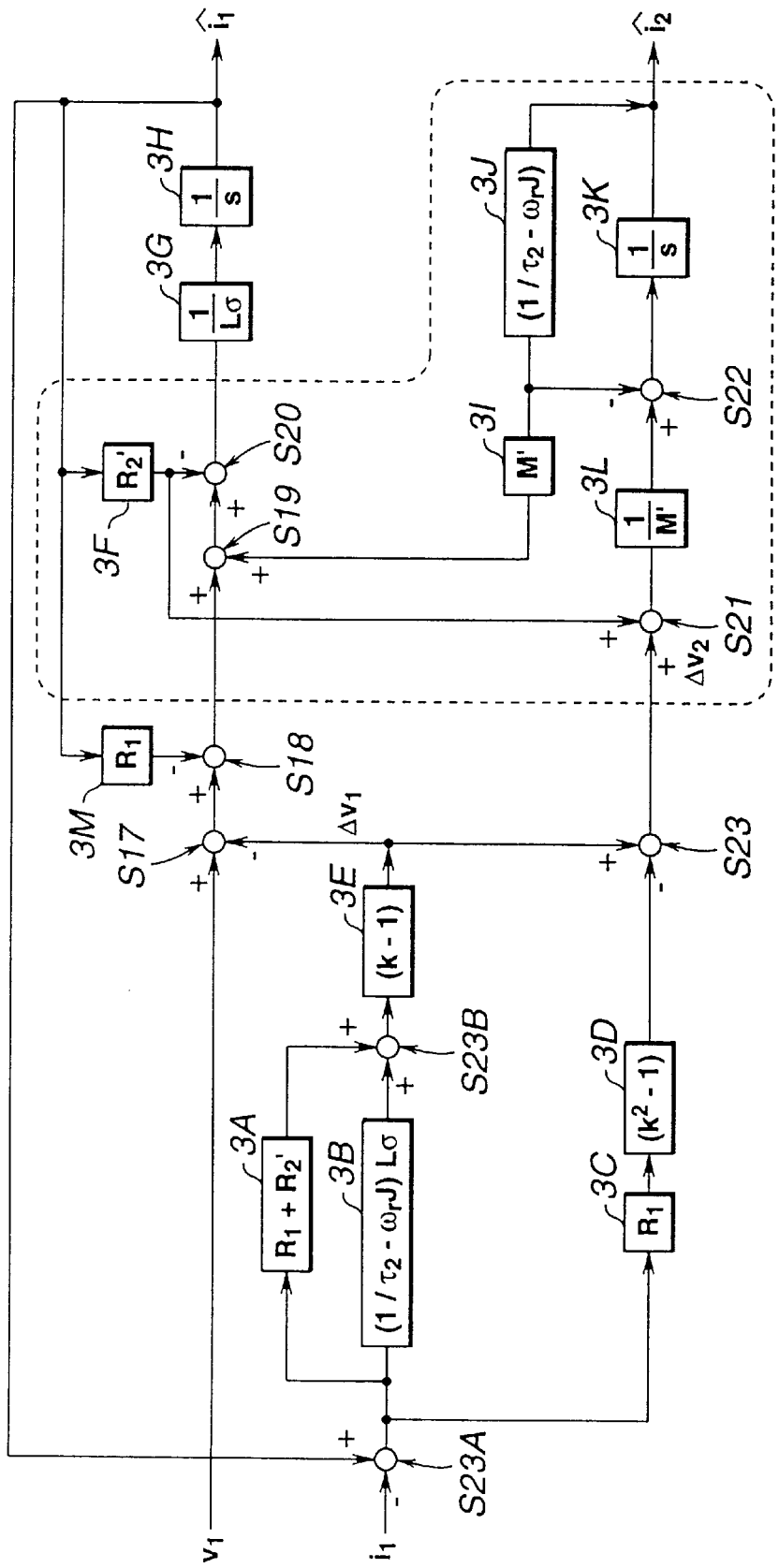
FIG. 3 is a circuit block diagram of a third preferred embodiment of the induction motor vector control apparatus especially representing a magnetic flux observer of the full order in the third embodiment.

FIG. 3 shows a third preferred embodiment of the vector control apparatus for the induction motor according to the present invention.

That is to say, FIG. 3 is a circuit block diagram of the magnetic flux observer of the full order in the second emdodiment in which a rotary coordinate transformation of a secondary circuit of the induction motor and a torque current are used as intermediate variables.

In order to enable the torque current component corresponding to the vector control used in the block diagram of FIG. 2 as the intermediate variable, if the terms of $R_2'$ are rearranged, the magnetic flux observer shown in FIG. 3 is resulted.

Figure 4:
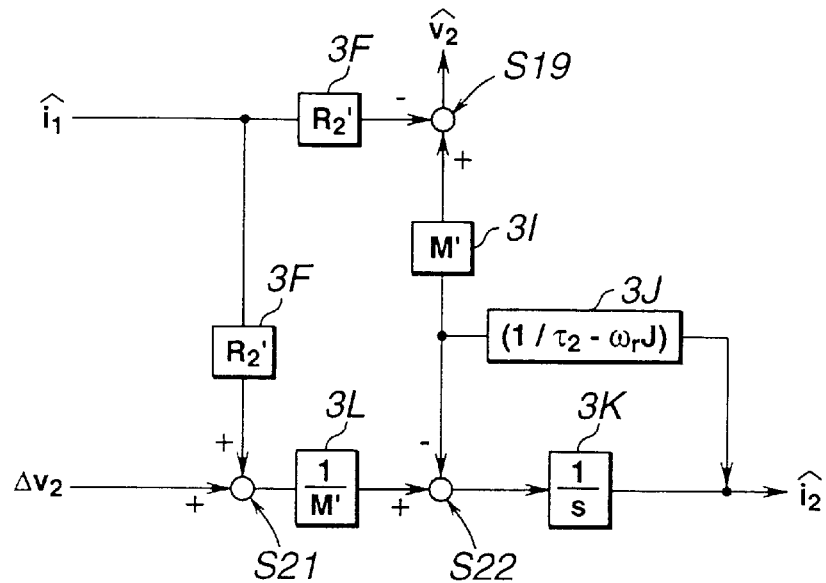
FIG. 4 is a circuit block diagram of a portion enclosed by a dot line of FIG. 3.

When a portion enclosing a dot line in FIG. 3 is extracted, the result thereof is shown in FIG. 4.

In FIG. 3, S17 denotes a first subtractor connected between $v_1$ input end and a second subtractor S23 connected to a first coefficient block 3E, S18 denotes a third subtractor connected between the first subtractor S17 and the first coefficient block 3E, S19 denotes a first adder connected between the third subtractor and a second coefficient block 3I, S20 denotes a fourth subtractor connected between the first adder S19 and a second adder S21, S22 denotes a fifth subtractor connected between a second coefficient block 3L and a third coefficient block 3I, a sixth subtractor S23A is connected between $i_1$ output end and $i_1$ input end, and S23B denotes a third adder connected between a fourth coefficient block 3A and a fifth coefficient block 3B.

In addition, in FIG. 3, the fifth coefficient block 3B is connected between the sixth subtractor S23A and the third adder S23B, the first coefficient block 3E is connected between the third adder S23B and the second subtractor S17, a sixth coefficient block 3C is connected between the sixth subtractor S23A and a seventh coefficient block 3D connected to the second subtractor S23, the first coefficient block 3E is connected between the third subtractor S18 and an eighth coefficient block 3F which is connected to $\hat{i}_1$ output end, to the second adder S21 and to the fourth subtractor S20, a ninth coefficient block 3G is connected between the fourth subtractor S20 and a first integrator 3H, a ninth coefficient block 3I is connected between the first adder S19 and the fifth subtractor S22, a tenth coefficient block 3J is connected between the fifth subtractor S22 and $\hat{i}_2$ output end, a second integrator S22 and $\hat{i}_2$ output end, a second integrator 3K is connected across the tenth coefficient block 3J, an eleventh coefficient block 3L is connected between the second adder S21 and the fifth subtractor S22, and a twelfth coefficient block 3M is connected between $\hat{i}_1$ input end and the third subtractor S18. It is noted that the portion enclosed by the dot line of FIG. 3 is indicated by FIG. 4.

Figure 5:
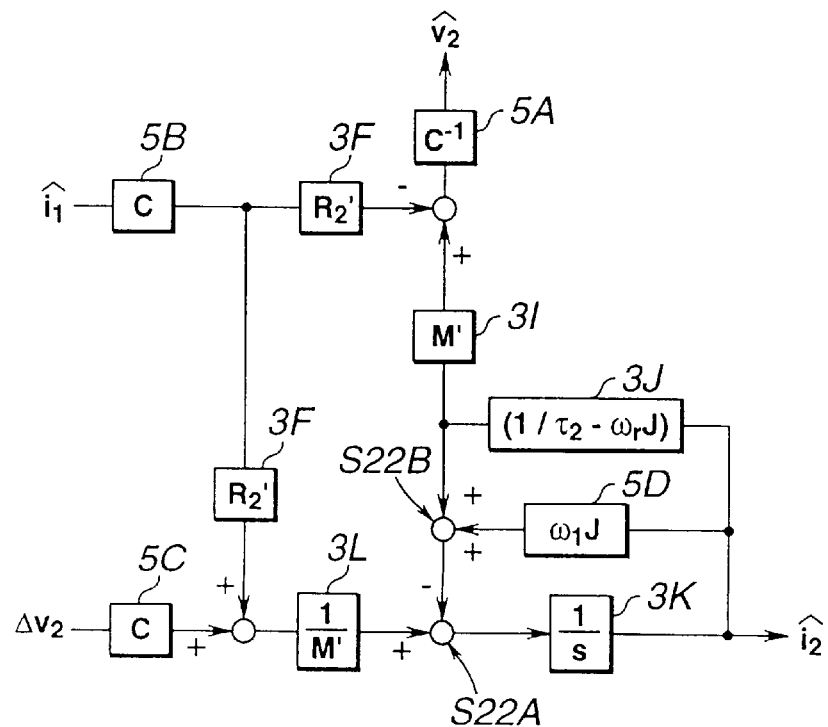
FIG. 5 is a circuit block diagram of the circuit portion shown in FIG. 4 in which inputs $i_1$ and $\Delta v_2$ and output of $\hat{v}_2$ of FIG. 4 are rotary coordinate transformed and a term of s is replaced with (s+$\omega_1$j).

In order to perform the rotary coordinate transformation for the portion shown in FIG. 4, the input and output ends are transformed into rotary coordinate transforming block C of 5B and 5C and an inverse coordinate transforming block $C^{-1}$ of 5C and the tenth coefficient block 3J by $(1/\tau_2 - \omega r J)$ is replaced with all of the tenth coefficient block 3J, a third adder S22B connected between the tenth coefficient block 3J and a twelfth coefficient block 5D by $\omega_1 J$, the third adder S22B being connected to the fifth subtractor of S22A as shown in FIG. 5.

Figure 6:
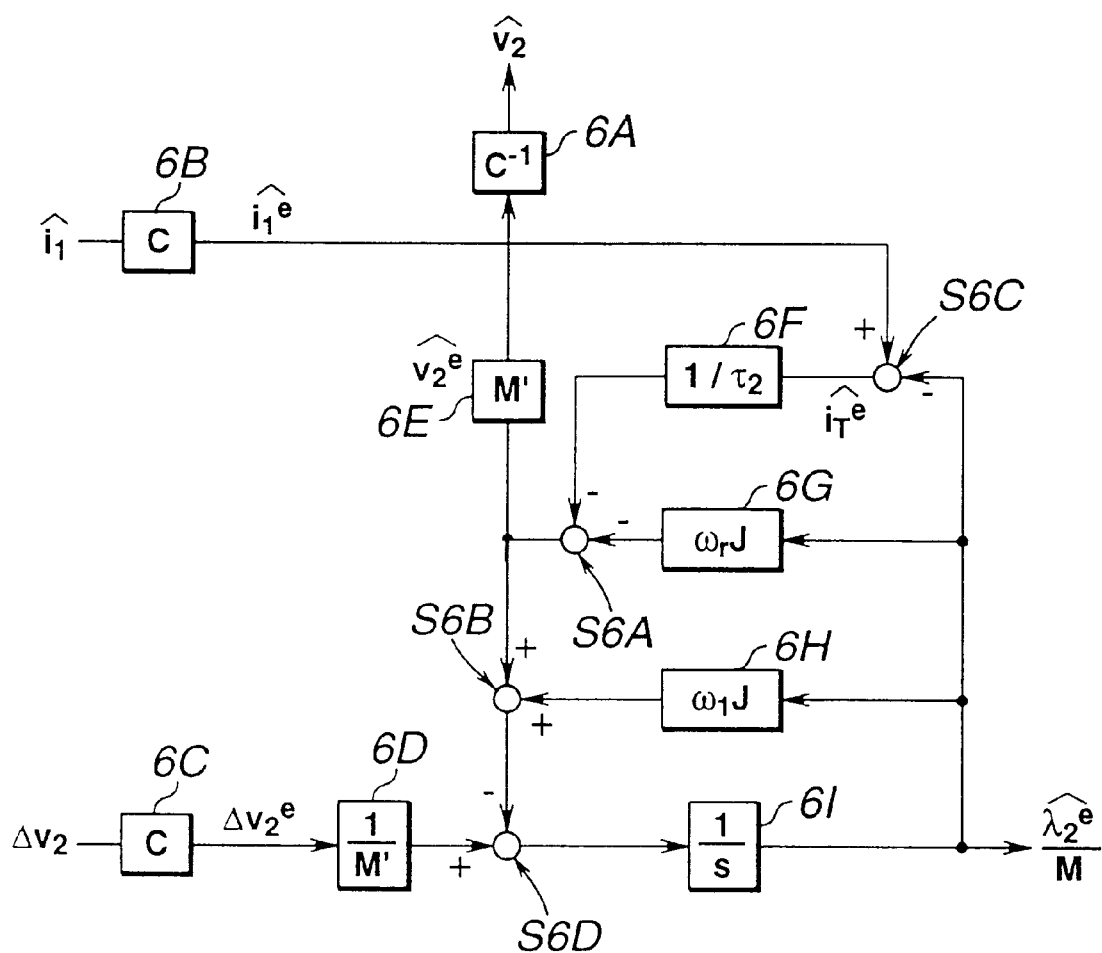
FIG. 6 is a circuit block diagram of the circuit portion shown in FIG. 5 in which a block related to a slip is clarified and a torque current component $i_T$ (=$i_1-i_2$) is defined.

Furthermore, when the torque current component $i_T = (i_1 - i_2)$ is defined in FIG. 5, a slip relating block is clarified as shown in FIG. 6.

That is to say, in FIG. 6, a rotary coordinate transforming block 6B which corresponds to 5B in FIG. 5 is connected to a first subtractor S6C (a plus input end), an inversed rotary coordinate transforming block 6A which corresponds to 5A outputs $\hat{v}_2$, a first coefficient block 6E of M' outputs $\hat{v}_2^e$ to the inverse rotary coordinate transforming block 6A, a second subtractor (a minus input end) S6A and the first subtractor S6C, a third coefficient block 6G is connected between the second subtractor S6A and $\hat{\lambda}_2^e/M$ output end, a third subtractor S6D is connected between the first adder S6B and a fifth coefficient block 6D, a first integrator 6I which corresponds to 3K in FIG. 5 is connected between the third subtractor S6D and $\Lambda_2^e/M$ output end, and a rotary coordinate transforming block 6C which corresponds to 5C in FIG. 5 is connected between $\Delta v_2^e$ to the fifth coefficient block 6D.

Figure 7:
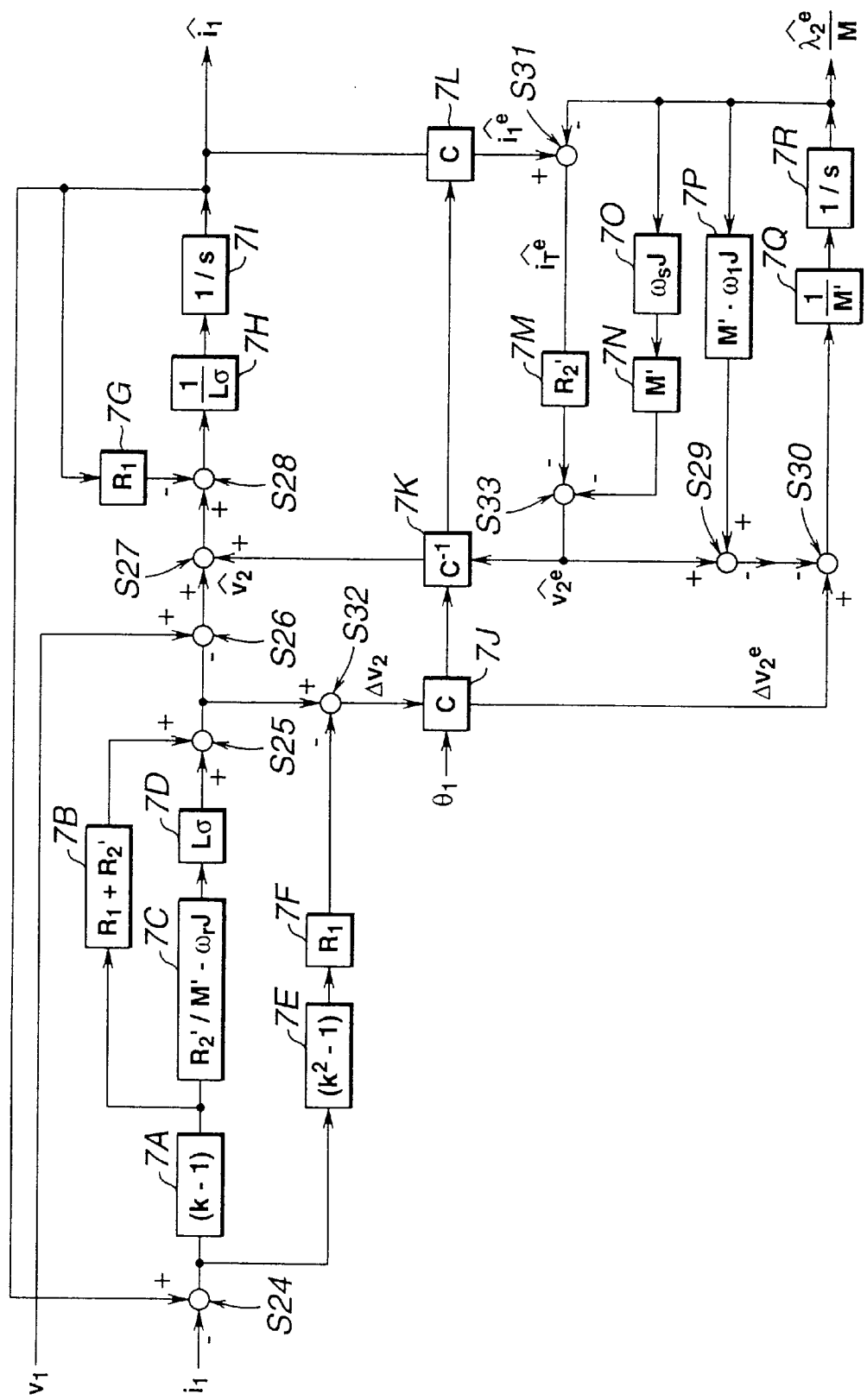
FIG. 7 is a circuit block diagram of a modification of the third embodiment shown in FIG. 3.

Consequently, FIG. 7 shows the magnetic flux observer of the full order as a modification of FIG. 3 in which the secondary circuit of the induction motor is under the rotary coordinate transformation, viz, the portion enclosed by the dot line of FIG. 3 is generally replaced with the block diagram shown in FIG. 6.

In details, a first coefficient block 7H shown in FIG. 7 corresponds to the ninth coefficient block 3G shown in FIG. 3, a second coefficient block 7I corresponds to the first integrator 3H, a third coefficient block 7F corresponds to the sixth coefficient block 3C, a fourth coefficient block 7E corresponds to the seventh coefficient block 3D, a fifth coefficient block 7A corresponds to the first coefficient block 3E, a sixth coefficient block 7B corresponds to the fourth coefficient block 3A, a combination of a seventh coefficient block 7C and an eighth coefficient block 7D corresponds to the fifth coefficient block 3B, a ninth coefficient block 7G corresponds to the twelfth coefficient block 3M, a tenth coefficient block 7J corresponds to the first subtractor 6C shown in FIG. 6 except θ1 input, an inverse rotary coordinate transforming block 7K corresponds to that denoted by 6A shown in FIG. 6, a rotary coordinate transforming block 7L corresponds to that denoted by 6B shown in FIG. 6, an eleventh coefficient block 7Q corresponds to the fifth coefficient block 6D shown in FIG. 6, a first integrator 7R corresponds to that denoted by 6I in FIG. 6. In addition, a first subtractor S24 shown in FIG. 7 corresponds to the sixth subtractor S23A, a first adder S25 shown in FIG. 7 corresponds to the third adder denoted by S23B in FIG. 3, a second subtractor S32 corresponds to that denoted by S23 shown in FIG. 3, a third subtractor S26 corresponds to the first subtractor S17, a fourth subtractor S27 is connected between the third subtractor S26 and the inverse coordinate transforming block 7K, a fifth subtractor S28 corresponds to the third subtractor S18, a sixth subtractor S33 corresponds to the second subtractor S6A shown in FIG. 6, a seventh subtractor S31 corresponds to the first subtractor S6C shown in FIG. 6, and a second adder S29 corresponds to the first adder S6B shown in FIG. 6. Then, a twelfth coefficient block 7M is connected between the sixth subtractor S33 and the seventh subtractor S31, a combination of a thirteenth coefficient block 7N and a fourteenth coefficient block 7O is connected between $\hat{\lambda}_2{}^c/M$ output end and the sixth subtractor S33, and a fifteenth coefficient block 7P is connected between the second adder S29 and $\hat{\lambda}_2{}^e/M$ output end.

(Fourth Embodiment)

In a fourth preferred embodiment of the vector control apparatus for the induction motor, the magnetic flux observer of the full order in which a compensation for an iron loss current component is included.

Figure 8:
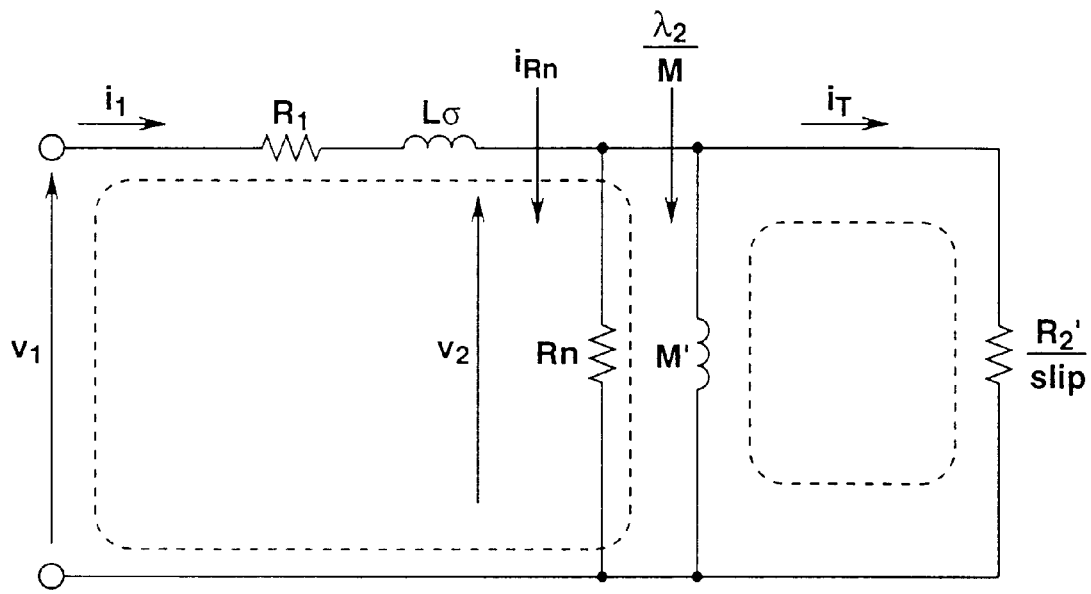
FIG. 8 is an approximation equivalent circuit in a T-I type equivalent circuit including an iron loss resistance of the induction motor.

FIG. 8 shows an approximation equivalent circuit of the induction motor in the T-I type including an iron loss resistance.

The iron loss current in the induction motor constitutes a third current circuit so that interference components occur in the primary and secondary circuits in the case of a transient phenomenon. However, only a steady-state component is approximated to make a current approximation on the equivalent circuit as shown in FIG. 8.

This approximation can calculate the iron loss current component iRn shown in FIG. 8 from the secondary voltage v2 and an iron loss resistance Rn.

Then, in order to compensate for the iron loss current component iRn, the iron loss current component may be subtracted from the current components which are transferred from the primary current to the secondary current shown in FIG. 7.

Figure 9:
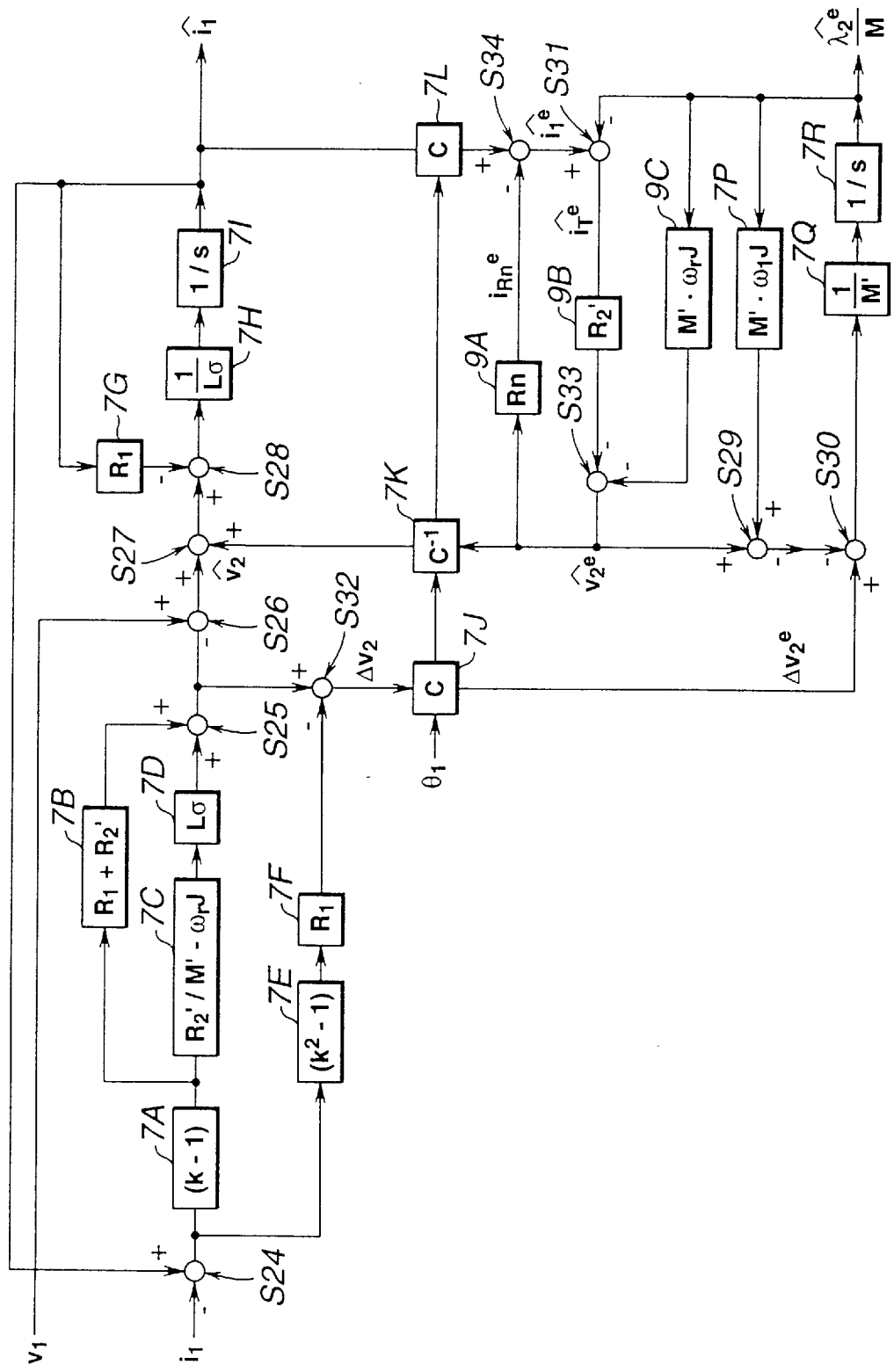
FIG. 9 is a circuit block diagram of the vector control apparatus for the induction motor especially representing the magnetic flux observer in a fourth embodiment according to the present invention.

Thus, FIG. 9 shows the magnetic flux observer of the full order in which the iron loss current component is compensated for the magnetic flux observer shown in FIG. 4 in which the rotary coordinate are transformed only for the secondary circuit.

That is to say, the same reference numerals and connection relationships shown in FIG. 9 generally designate corresponding elements and connection relationships shown in FIG. 7 except the following elements described below.

That is to say, an iron resistance component coefficient block 9A is connected between the second adder S29 and an eighth subtractor S34. A secondary resistance component coefficient block 9B is connected between the sixth subtractor S33 and the seventh subtractor S31. A (M'·ωrJ) coefficient block 9C iS connected between the sixth subtractor S33 and $\lambda_2{}^e/M$ output end.

In the magnetic flux observer of the full order shown in FIG. 9, the compensation on the rotary coordinates for the iron loss current is made.

The compensation for the iron loss current is applicable to the observer shown in FIG. 2.

Figure 10:
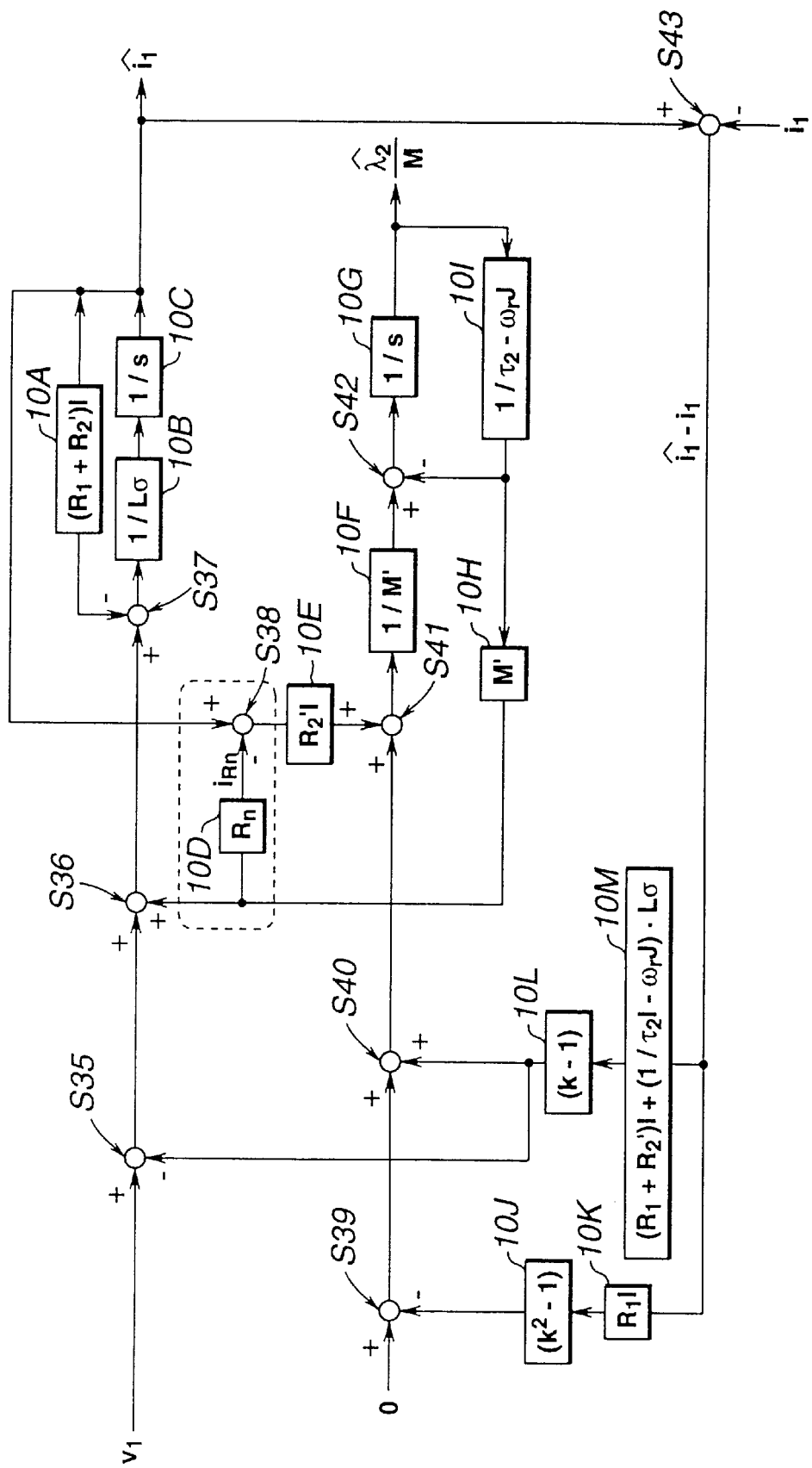
FIG. 10 is a circuit block diagram of a modification of the magnetic flux observer of the full order in the fourth embodiment shown in FIG. 9.

FIG. 10 shows a circuit block diagram of the magnetic flux observer of the full order as a modification of the fourth embodiment in which the compensation for the iron loss current made in the case of FIG. 9 is applicable to the magnetic flux observer shown in FIG. 2.

Hence, the observer shown in FIGS. 9 and 10 can compensate for the iron loss current component. Consequently, an error in an estimation of the magnetic flux generated due to an iron loss current component not conveniently considered can be minorated.

In the magnetic flux observer of the full order shown in FIG. 9, the compensation on the rotary coordinates for the iron loss current is made.

The compensation for the iron loss current is applicable to the observer shown in FIG. 2.

FIG. 10 shows a circuit block diagram of the magnetic flux observer of the full order as a modification of the fourth embodiment in which the compensation of the fourth embodiment in which the compensation for the iron loss current component made in the case of FIG. 9 is applicable to the magnetic flux observer shown in FIG. 2.

Hence, the observer shown in FIGS. 9 and 10 can compensate for the iron loss current component.

Consequently, an error in an estimation of the magnetic flux generated due to an iron loss current component conventionally considered can be minorated.

It is noted that as shown in FIG. 10, an iron loss resistance component coefficient block 10D is connected between a plus input end of an adder S36 which corresponds to the first adder S10 shown in FIG. 2 and a subtractor S38 intervened between an R'$_2$I coefficient block 10E which corresponds to the fifth coefficient block 2A shown in FIG. 2 and $\hat{i}_1$ output end.

(Fifth Embodiment)

In each of the first, second, third, and fourth embodiments, the magnetic flux observer of the full order in the time-continuous system has been described.

To achieve the magnetic flux observer of the full order in a digital computer, it is necessary to make a discrete (in a time-discrete form) in each calculation block.

Figure 11:
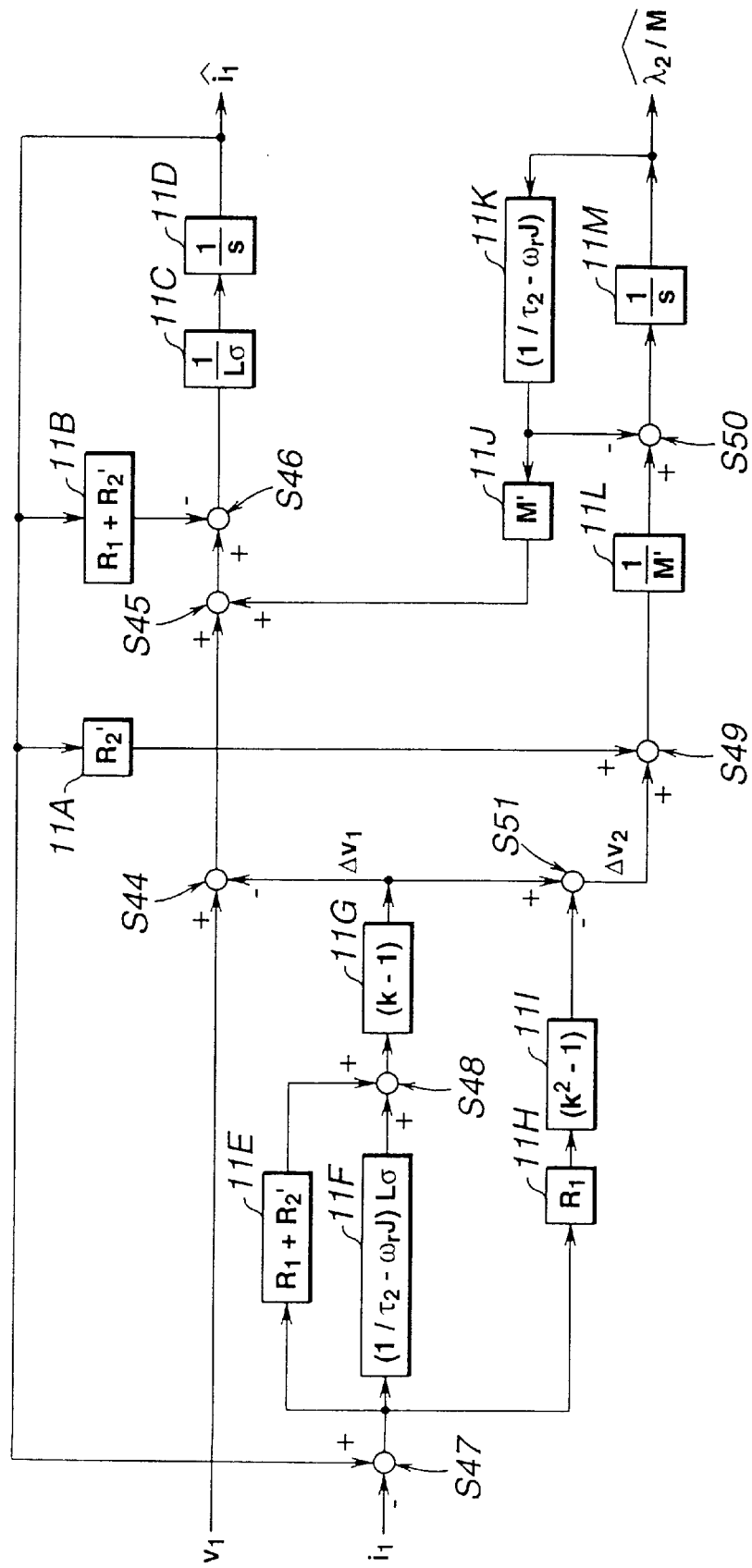
FIG. 11 is a circuit block diagram of the magnetic flux observer based on equations recited in TABLE 11 and TABLE 12.

FIG. 11 shows a circuit block diagram of the magnetic flux observer of the full order based on the equations (11-1), (11-2) in TABLE 11 and (12-1), (12-2), (12-3), and (12-4) in TABLE 12.

Figure 12:
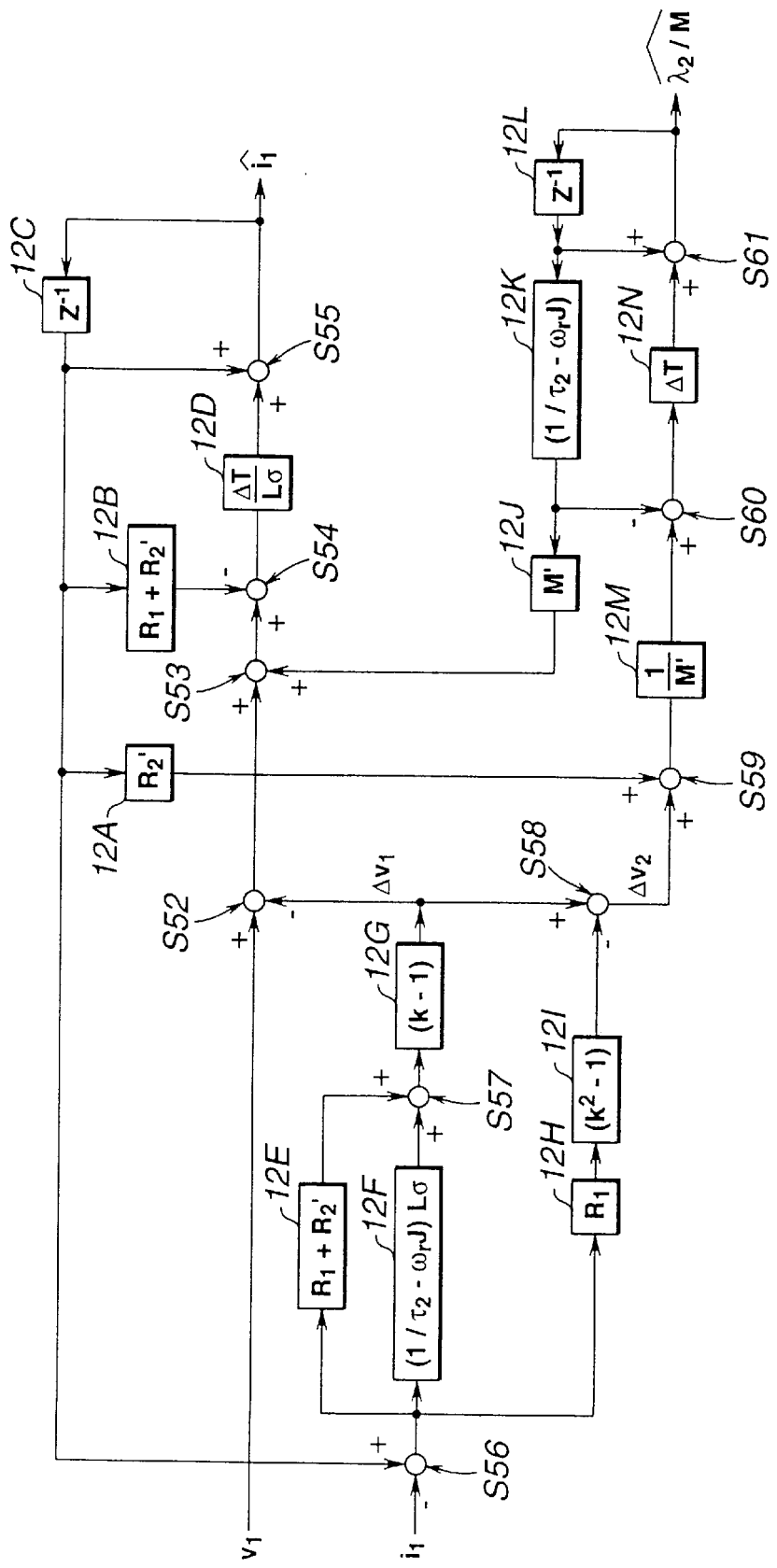
FIG. 12 is a circuit block diagram of the magnetic flux observer of the full order shown in FIG. 11 and in which a $z^{-1}$ operator is used.

In order to make a time-discrete (quantitization) of the calculation block of FIG. 11, FIG. 11 is simply approximated using a $z^{-1}$ operator in a z transform to derive a circuit block diagram of FIG. 12. The $z^{-1}$ operator is used, an integration term of 1/s (s denotes a Laplace transform operator) can be represented by the approximated block diagram to which a variation from a previous value is added.

In FIG. 11, S47 denotes a first subtractor connected between $i_1$ input end and $\hat{i}_1$ output end, S44 denotes a second subtractor connected between $v_1$ input end and a first coefficient block 11G, S45 denotes a first adder connected between the second subtractor S44 and a second coefficient block 11J, S46 denotes a third subtractor connected between the first adder S45 and a third coefficient block 11B, S48 denotes a second adder connected between a fourth coefficient block 11E and a fifth coefficient block 11F, S49 denotes a third adder connected between a fourth subtractor S51 and a sixth coefficient block 11A, and S50 denotes a fifth subtractor connected between a seventh coefficient block 11L and an eighth coefficient block 11J.

In addition, a ninth coefficient block 11E is connected between the first subtractor S47 and the second adder S48, the fifth coefficient block 11G is connected between the second adder S48 and each of the second subtractor S44 and the fourth subtractor S51, a combination of a tenth coefficient block 11H and an eleventh coefficient block 11I is connected between the first subtractor S47 and the fourth subtractor S51, the sixth coefficient block 11A is connected between $\hat{i}_1$ output end and the third adder S49, the third coefficient block 11B is connected between $\hat{i}_1$ output end and the third subtractor S46, a combination of a twelfth coefficient block 11C is connected between the third subtractor S46 and $i_1$ output end, the second coefficient block 11J is connected between the first adder S45 and the minus input end of the fifth subtractor S50, a fourteenth coefficient block 11K is connected between $\lambda 2/M$ input end and the second coefficient block 11J, the seventh coefficient block 11L is connected between the third adder S49 and the fifth subtractor S50, and a first integrator 11M is connected between the fifth subtractor S50 and $\lambda 2/M$ output end.

Next, the difference in the block diagram between the circuit blocks in FIGS. 11 and 12 will be described below.

As shown in FIG. 12, the combination of the twelfth coefficient block 11C and the thirteenth coefficient block 11D is replaced with a $\Delta T/L\sigma$ block 12D, a first adder S55 is connected between the $\Delta T/L\sigma$ block 12D and the third coefficient block 11B which corresponds to the block denoted by 12B in FIG. 12, a first $z^{-1}$ operator 12C is connected between the plus end of the first adder S55 and $\hat{i}_1$ output end, the integrator 11M shown in FIG. 11 is replaced with a $\Delta T$ block 12N, a second adder S61 is connected between the $\Delta T$ block 12N and a second $z^{-1}$ operator 12L, and the second $z^{-1}$ operator is connected between $\lambda 2/M$ output end the plus input end of the second adder S61 which is connected to the fourteenth coefficient block 12K which corresponds to 11K in FIG. 11.

However, since sinusoidal voltages and current flow occur in the induction motor, the variation rate with respect to the time is enlarged if the frequency is increased. Hence, when the sinusoidal wave is accurately estimated, it is necessary to shorten a calculation cycle time.

Hence, it is necessary to set a calculation cycle is short as several ten microseconds in order to estimate frequency components as high as several ten Hz up to an accuracy equal to or below 1%.

A cause of the error may include an influence of the error when the quantitization is carried out. Especially, the secondary magnetic flux $\lambda 2$ is rotated together with the rotor and, for the secondary circuit in the induction motor, a problem does not occur in the simple integration but occurs in the fact that how this revolution components on the secondary circuit can be calculated.

To solve this problem, in each of the first through fourth embodiments, the primary circuit is calculated on stator coordinates and the secondary circuit is integrated after the transformation onto the rotor coordinates.

Since the rotary components on a power supply frequency can accurately be calculated, a unit time of the quantitization can be set to a relatively long time and an estimation error can be minorated.

However, since the rotary coordinate transformation in each of the first, second, third, and fourth embodiments is present by a plurality of positions, a quantity of calculations are many. Especially, when many of the rotary coordinate transformations are applied, such a calculation error as a bit overflow due to a limitation of the number of digits in the digital computation occurs. Hence, it is preferable for the number of calculations in the rotary coordinate transformation to be as small as possible.

Therefore, in the fifth embodiment, the concept of the rotary (rotor) coordinate system is adopted into a part of the calculation block based on the stator coordinate system. However, in place of the secondary circuit transformed into the rotary coordinate system which is synchronized with the power supply, a rotary (rotor) coordinate transformation corresponding to a phase advance of a velocity of the rotor of the induction motor IM is applied to the fifth embodiment.

Consequently, the fifth embodiment achieves the magnetic flux observer in which the rotary coordinate transformation is performed only once and the error in the magnetic flux estimation in the digital computer in which the calculation block is quantitized (in the discrete form).

Figure 13:
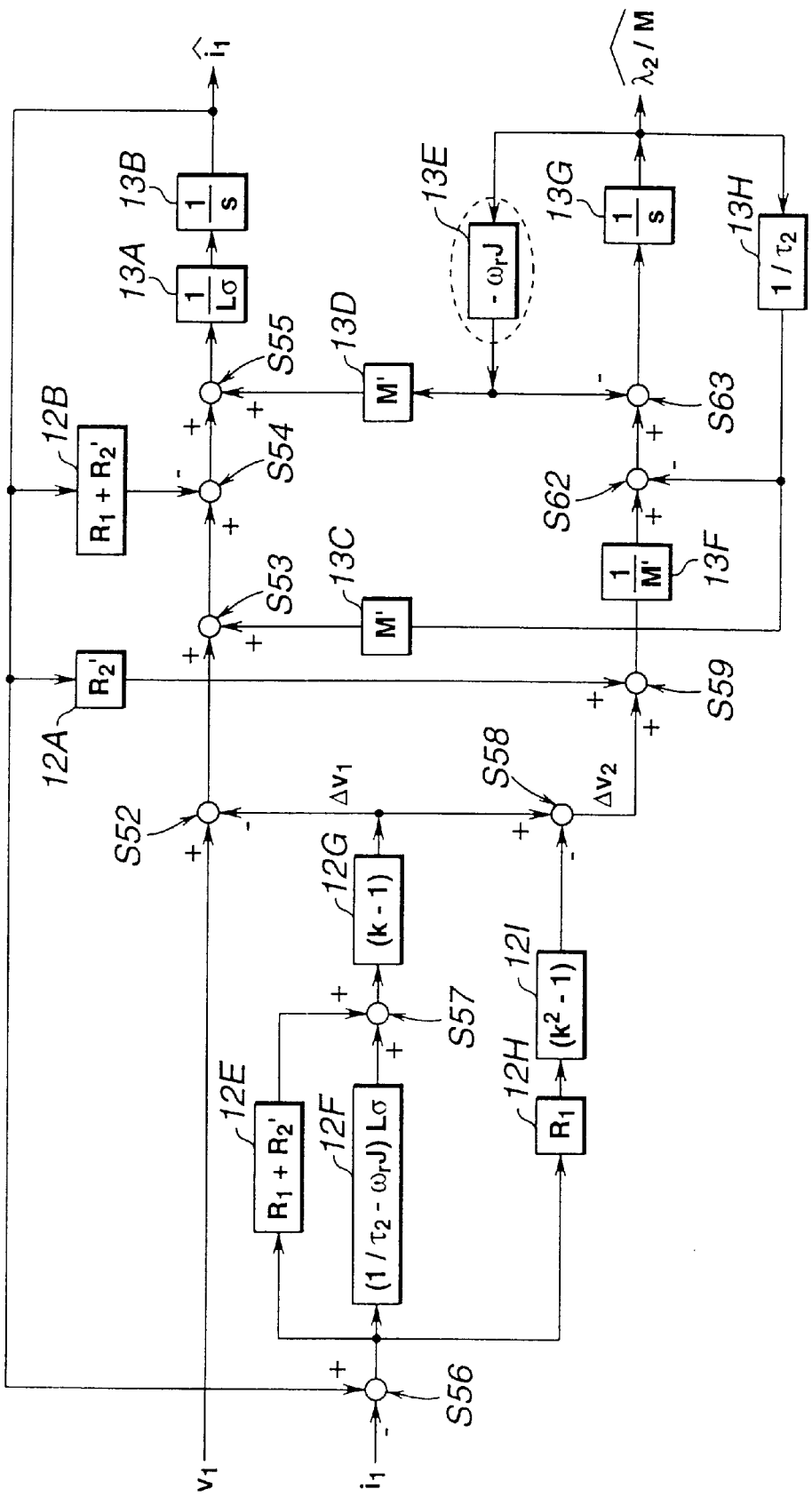
FIG. 13 is a circuit block diagram of the magnetic flux observer of the full order shown in FIG. 11 and in which feedback terms related to integration terms of a secondary circuit are separated into I and J terms.

First, when the feedback term 11k connected to the integrator term 11k connected to the integrator term of 1/s denoted by 13E in FIG. 11 are separated into I and J terms, the result is shown in a circuit block diagram of FIG. 13.

That is to say, a block of $-\omega rJ$ denoted by 13E in FIG. 13 is inserted and a block of $1/\tau_2$ denoted by 13H is inserted as shown in FIG. 13.

Figure 14:
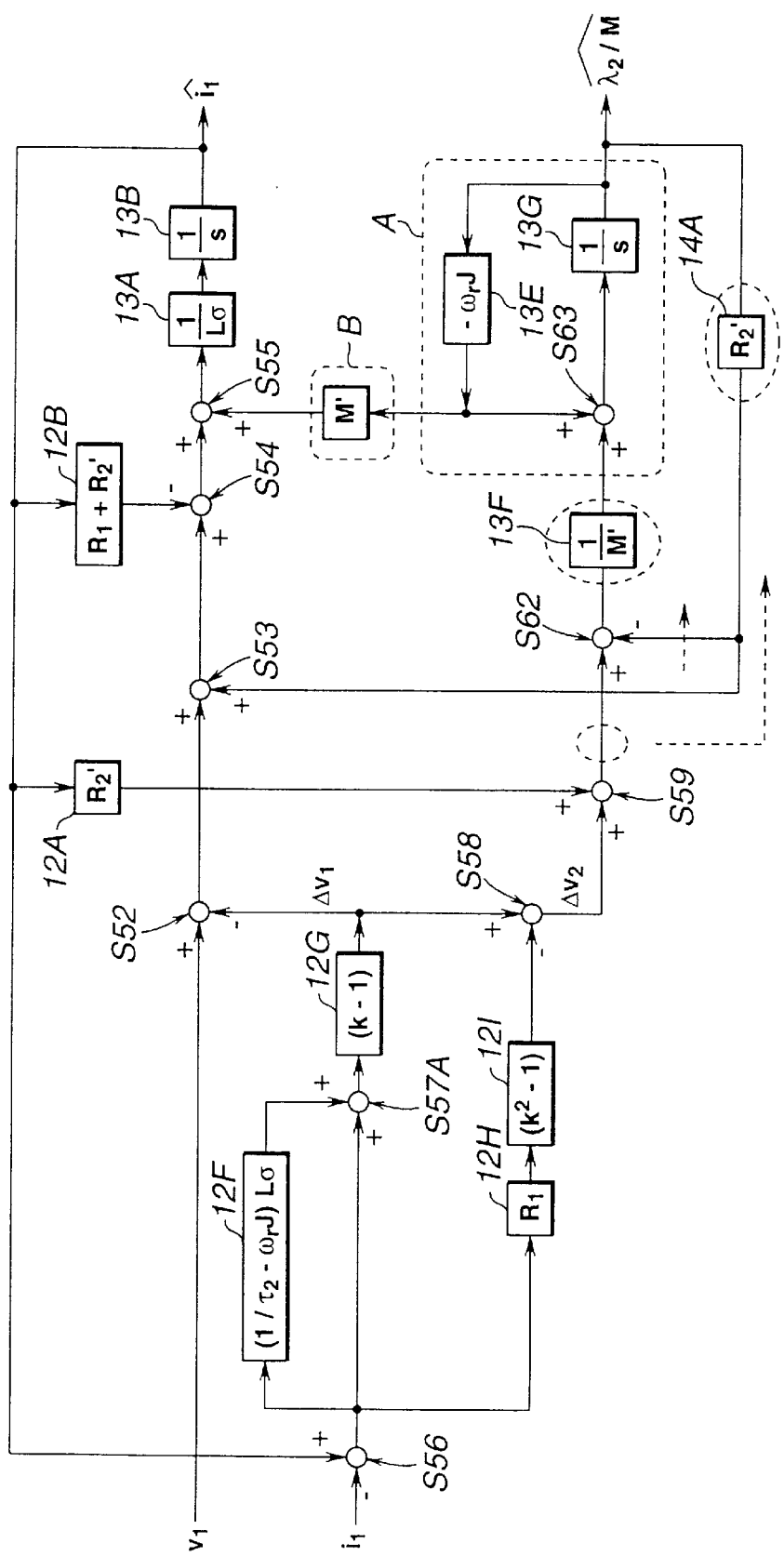
FIG. 14 is a circuit block diagram of the magnetic flux observer of the full order shown in FIG. 13 and in which whole M' related components are rearranged to $R_2$' related components.

Furthermore, when since $1/\tau_2 = M'/R_2'$, the value M' component blocks are rearranged to $R_2'$, the result is shown in the circuit block diagram of FIG. 14.

In this rearrangement from FIG. 13 into FIG. 14, the following equation (13) is used.

$$(1/\tau_2)*(1/M')=(M'/R_2')*(1/M')=>R_2' \qquad (13).$$

Hence, the term of $R_2'$ denoted by 14A is connected between $\lambda_2/M$ output end to a plus end of an adder denoted by S53 and a minus end of a subtractor denoted by S62.

Figure 15A:
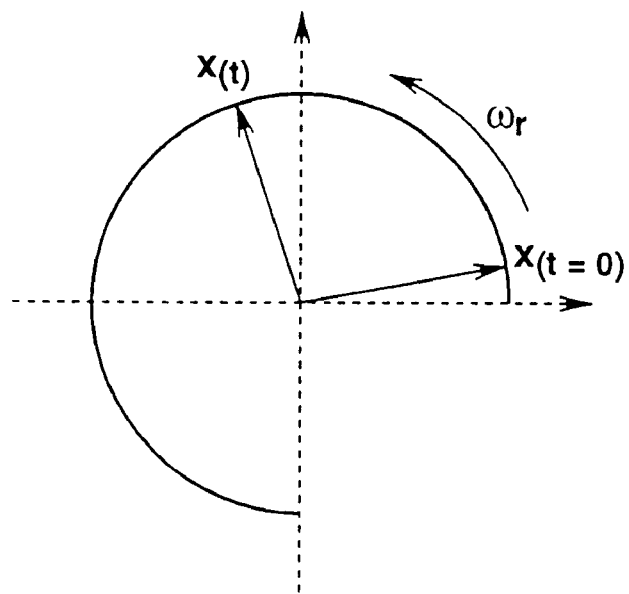
FIGS. 15A and 15B are an explanatory view of a rotation vector and a circuit block diagram representing a portion enclosed by a dot line of A in FIG. 14.
Figure 15B:
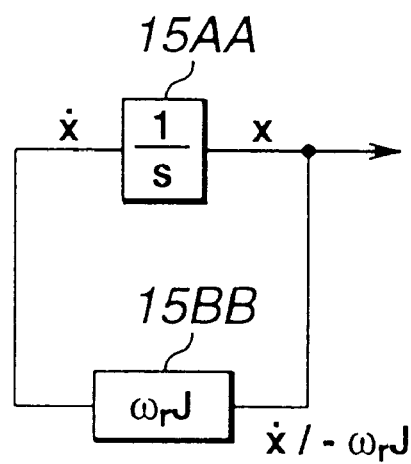

When a part of the circuit block shown in FIG. 14 denoted in a dot line by A is shown in FIG. 15B.

In FIG. 15B, a block denoted by 15AA corresponds to a block 13G shown in FIG. 15B and a block denoted by 15BB corresponds to a minus of a block denoted by 13E in FIG. 14.

As shown in FIG. 15A, if a certain initial value (x(t=0)) is present, it means a vector having a constant amplitude and whose phase only is rotated by $\omega r$.

Figure 16A:
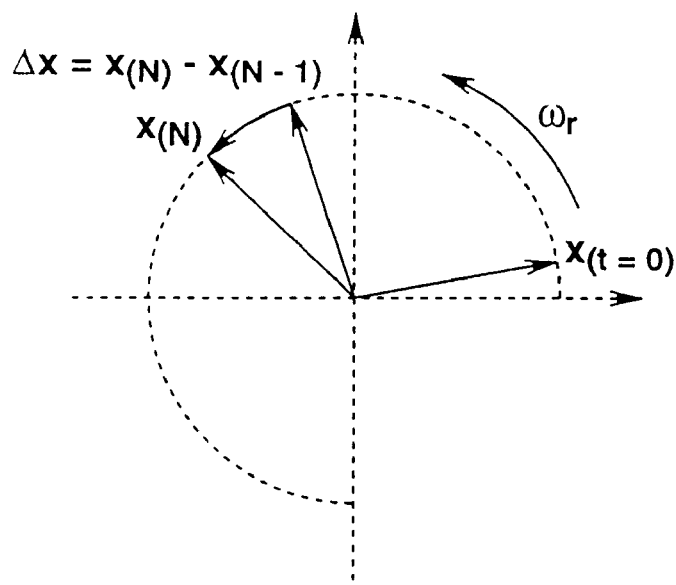
FIGS. 16A and 16B are an explanatory view of a concept of a rotary (rotor) coordinate transformation and a circuit block diagram embodying the rotary coordinate transformation shown in FIG. 15A.
Figure 16B:
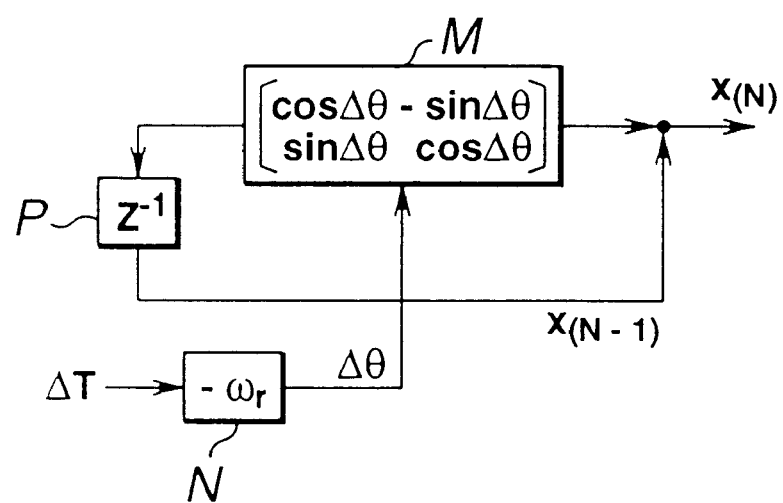

Hence, in order to represent the rotation of the vector while a discrete unit time $\Delta T$ has passed, a rotary coordinate transformation which revolves by $\Delta\theta$ as shown in FIG. 16B is equivalently applicable to the circuit portion of FIG. 15B.

A revolution phase angle $\Delta\theta$ can be calculated as follows:

$$\Delta\theta=\omega r*\Delta T \qquad (14).$$

Figure 17:
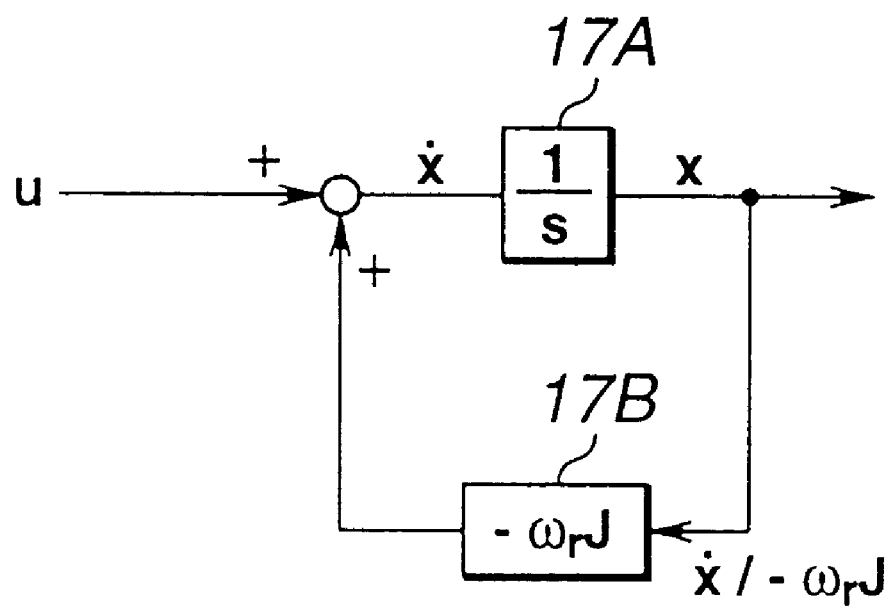
FIG. 17 is a circuit block diagram of a circuit portion enclose by a dot line of A in FIG. 14.

Since the input term u(t) is present in the circuit portion denoted by the dot line of A in FIG. 14, the circuit block diagram of A in FIG. 4 is actually represented by that shown in FIG. 17. Some approximation is needed to represent a combination of the circuit portion shown in FIG. 17 and the rotary coordinate transformation shown in FIG. 16A.

Figure 18A:
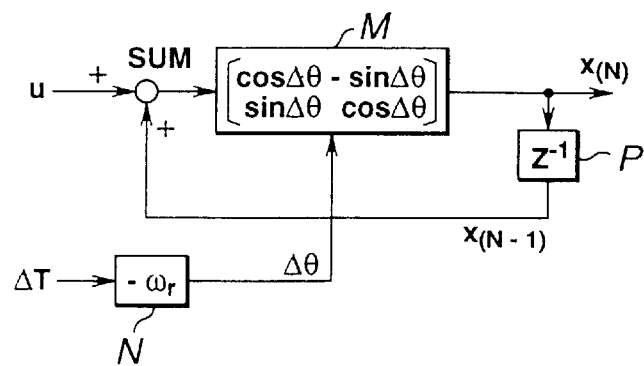
FIGS. 18A, 18B, and 18C are circuit block diagrams of a combination of the circuit portion shown in FIG. 17 with the circuit block diagram of the rotary coordinate transformation shown in FIG. 16B.
Figure 18B:
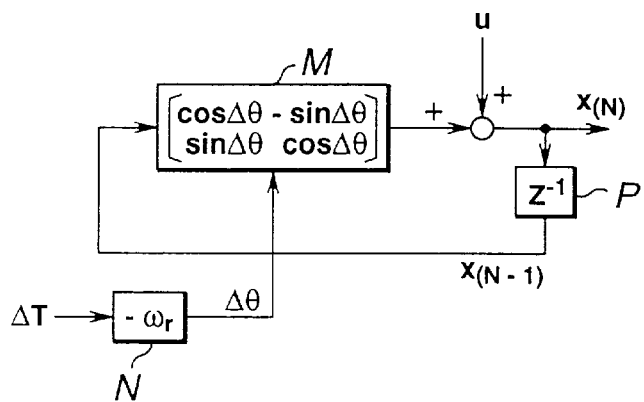
Figure 18C:
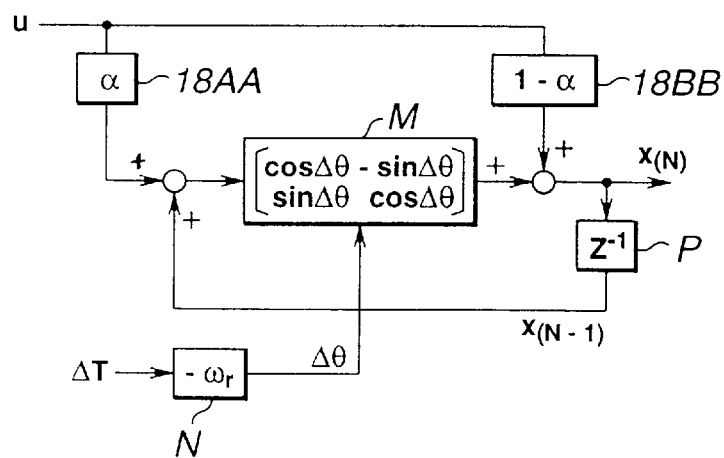

Then, this representation is approximately shown in each of FIGS. 18A, 18B, and 18C.

FIG. 18A shows a replaceable circuit block of the circuit block portion denoted by the dot line of A shown in FIG. 14 in which the input term of u(t) is added before the rotary coordinate transformation is carried out.

FIG. 18B shows another replaceable circuit block of the circuit portion denoted by A shown in FIG. 14 in which the input term of u(t) is added after the rotary coordinate transformation is carried out.

FIG. 18C shows a still another replaceable circuit block diagram of the circuit portion denoted by A shown in FIG. 14 in which the input term u(t) is multiplied by weights of $\alpha$ and $(1-\alpha)$ respectively before and after the rotary coordinate transformation of matrix;

$$\begin{bmatrix} \cos\Delta\theta & -\sin\Delta\theta \\ \sin\Delta\theta & \cos\Delta\theta \end{bmatrix}.$$

It is also noted that FIG. 18C represents a general form of each of FIGS. 18A and 18B, if $\alpha=0$, FIG. 18C is equivalent to FIG. 18A and, if $\alpha=1$, FIG. 18C is equivalent to FIG. 18B.

Although three kinds of method in FIGS. 18A, 18B, and 18C include the error in the quantitization, an accuracy of the estimation of the secondary magnetic flux observer can be improved by the accurate approximation of the rotation as compared with a case wherein in a first order approximation the circuit block of FIG. 11 is quantitized.

Figure 19:
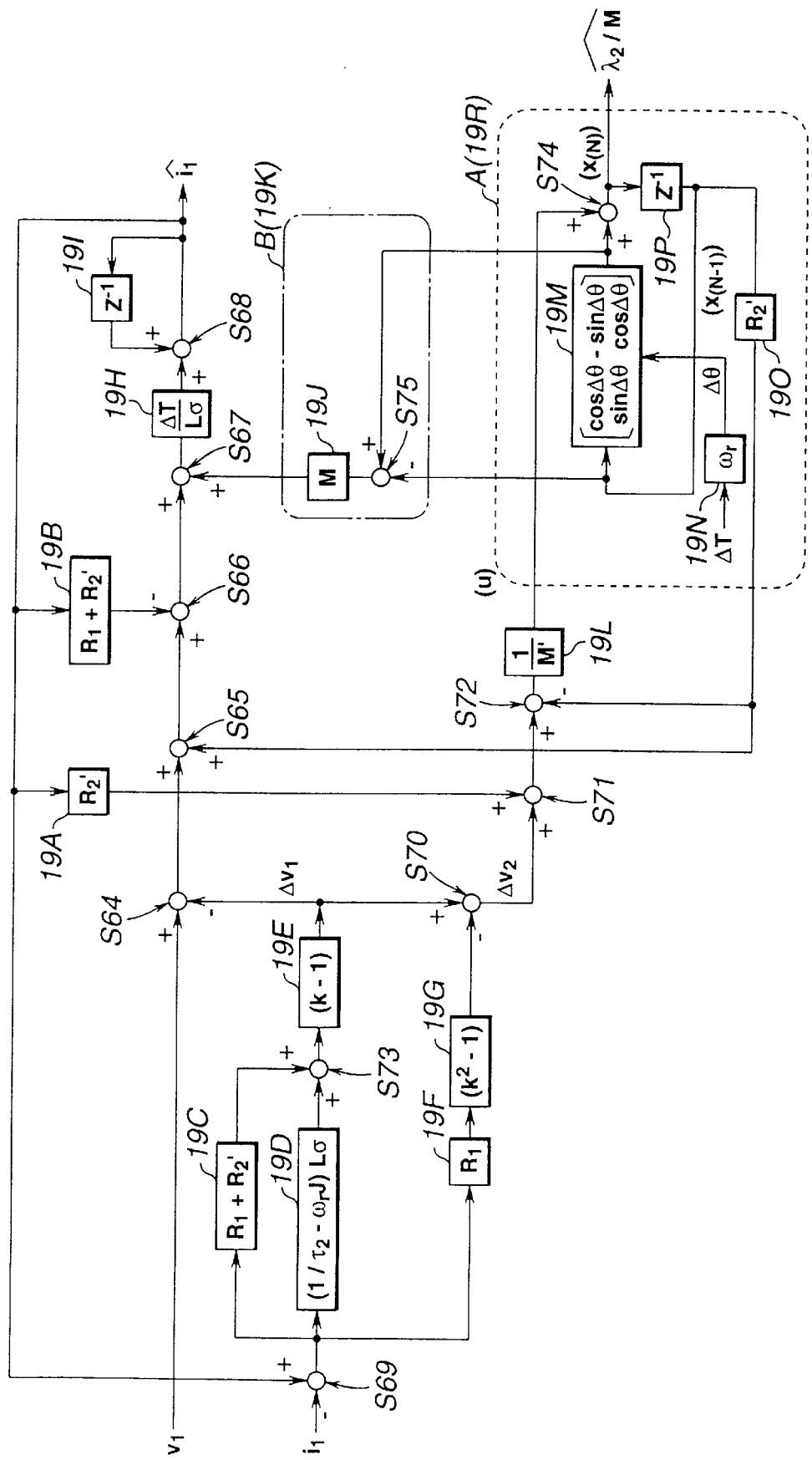
FIGS. 19, 20, and 21 are circuit block diagrams of the magnetic flux observer in the vector control apparatus for the induction motor according to the present invention especially representing the magnetic flux observer in a fifth preferred embodiment related to FIG. 18A, in a modification of the fifth embodiment related to FIG. 18B, and in another modification of the fifth embodiment related to FIG. 18C, respectively.
Figure 20:
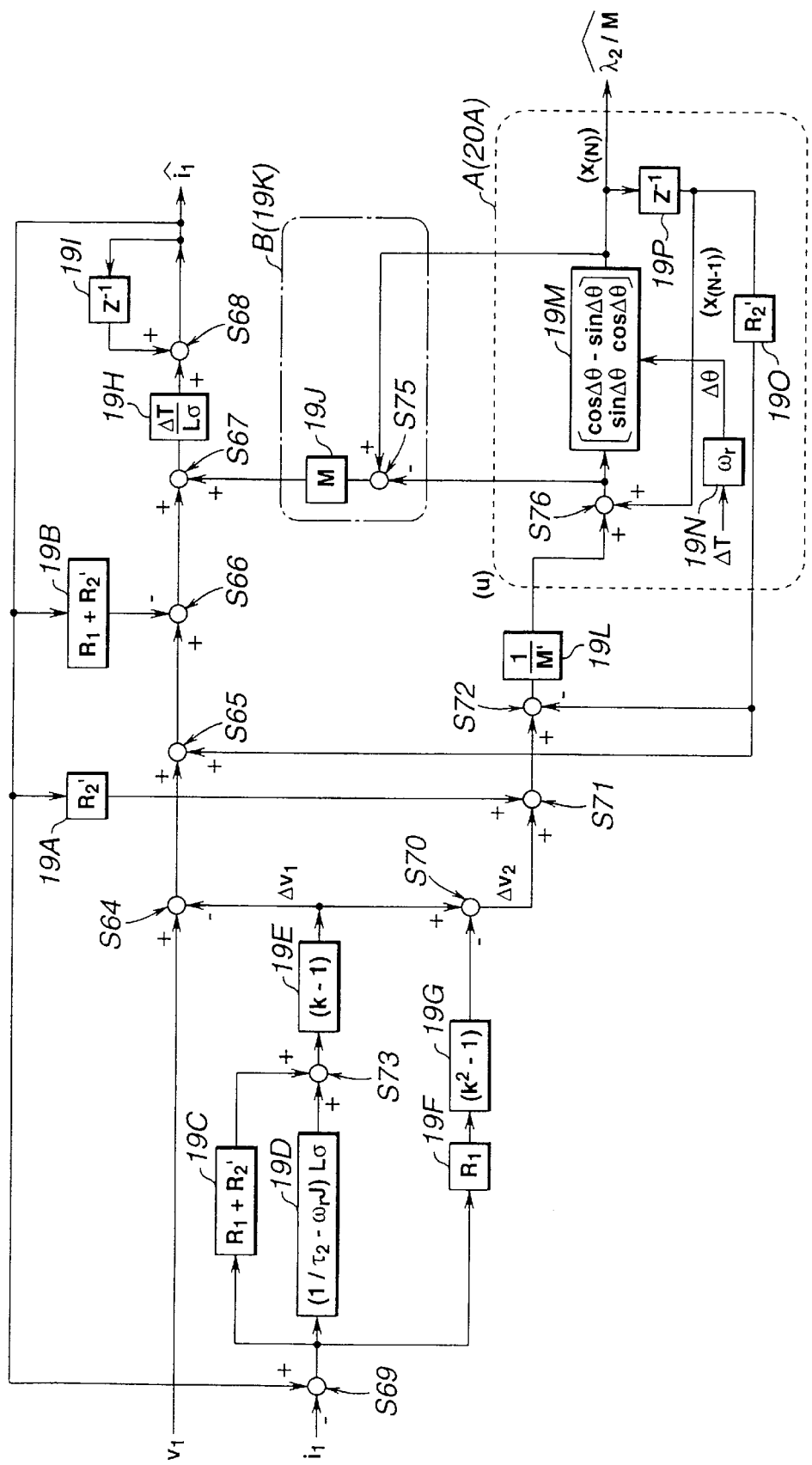
Figure 21:
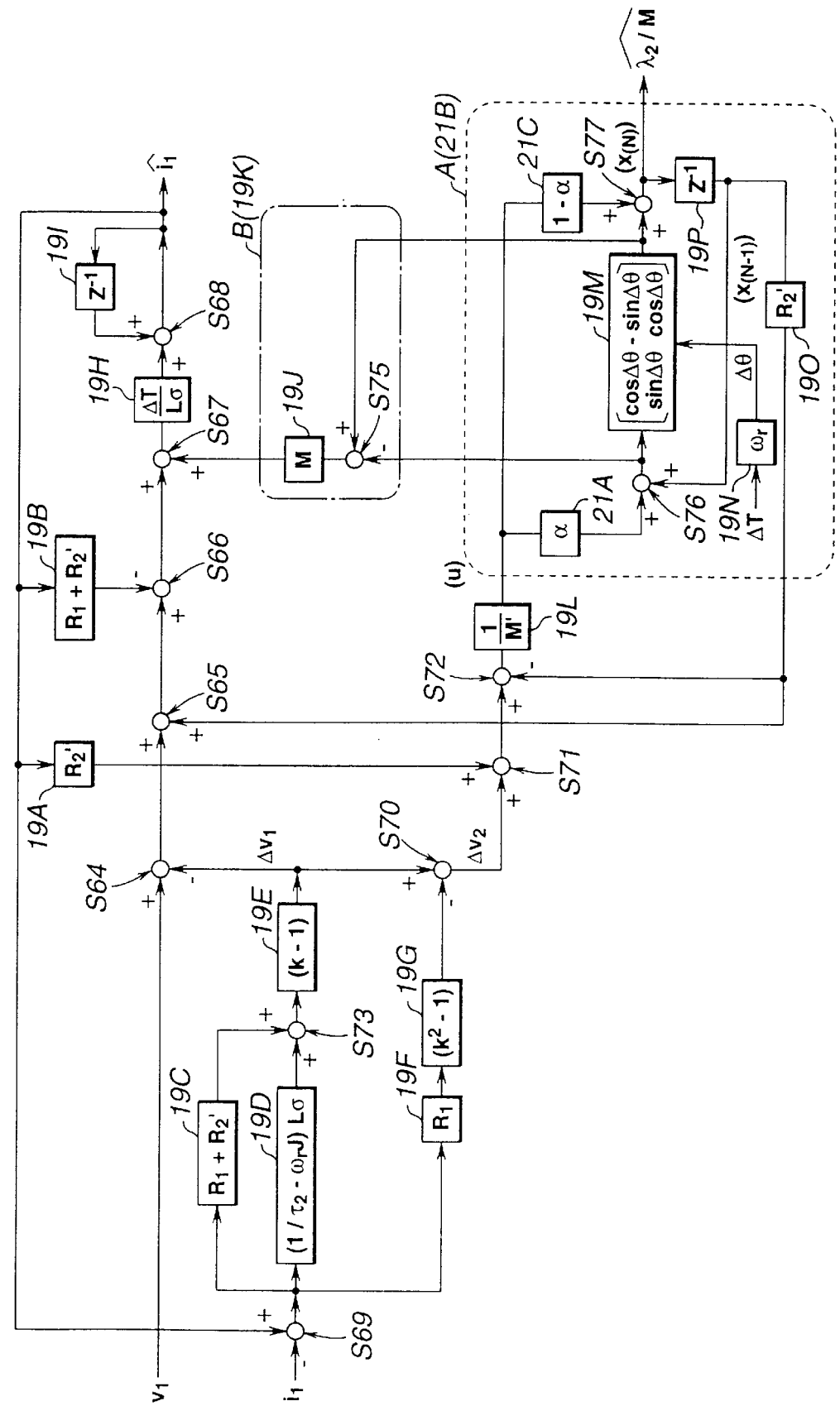

Hence, FIGS. 19, 20, and 21 show replacements of the secondary circuit denoted by A in FIG. 13 with respectively corresponding circuit portions shown in FIGS. 18A, 18B, and 18C, respectively, with the other integration term being changed to the discrete form by the first order approximation.

It is noted that, in a broken line portion B(19K) shown in each of FIGS. 19, 20, and 21, a difference of data before and after the rotary coordinate transformation denoted by M, viz., 19M is made in order to approximate the term of $\omega rJ$ $i_2$ $\Delta T$ corresponding to the portion B in FIG. 14.

As shown in FIG. 19, the broken line portion of A (19R) is a case wherein the circuit of FIG. 18A is applied.

Similarly, the broken line portion of A(20A) shown in FIG. 20 is a case wherein the circuit portion of FIG. 18B is applied.

The broken line portion of A(21B) shown in FIG. 21 is a case wherein the circuit of FIG. 18C is applied.

It is noted that a value of $\alpha$ shown in each of FIGS. 19, 20, and 21 is an arbitrary in a range from 1 to 0.

Representatively in FIG. 19, a first subtractor S69 is connected between $\hat{i}_1$ output end and $i_1$ input end, a second subtractor S64 is connected between $v_1$ input end and a third subtractor S70, a first adder S65 is connected between the second subtractor S64 and $R_2'$ coefficient block 190 and a fourth subtractor S72, the fourth subtractor S72 is connected between a fifth subtractor S71 and the fourth subtractor S72, a sixth subtractor S66 is connected between the first adder S65 and a second coefficient block 19B, a second adder S67 is connected between the sixth subtractor S66 and a third coefficient block 19J, a third adder S68 is connected between a fourth coefficient block 19H and the $z^{-1}$ operator block 19I, a seventh subtractor S75 is connected between the $z^{-1}$ operator block 19P and the input end of the rotary coordinate transform block 19M and the output end thereof 19M, a fourth adder S74 is connected between a fifth coefficient block 19L and the output end of the rotary coordinate transform matrix block 19M, and a fifth adder S73 is connected between a fifth coefficient block 19C and a sixth coefficient block 19D.

In addition, the fifth coefficient block 19C is connected between the first subtractor S69 and the fifth adder S73, the sixth coefficient block 19D is connected between the first subtractor S69 and the fifth adder S73, a seventh coefficient block 19E is connected between the fifth adder S73 and the second subtractor S64 and the third subtractor S70, a combination of an eighth coefficient block 19F and a ninth coefficient block 19G is connected between the first subtractor S69 and the third subtractor S70, a tenth coefficient block 19A is connected between $\hat{i}_1$ output end and the fifth subtractor S71, an eleventh coefficient block 19N is connected between $\Delta T$ input end and the rotary coordinate transform block 19M, the $z^{-1}$ operator block 19P is connected between $\hat{\lambda}_2/M$ output end, the seventh subtractor S75, and R2' coefficient block 190.

Since except each of the circuit portion A(20A) in FIG. 20 and that A(21B) in FIG. 21, each circuit structure of FIGS. 20 and 21 is the same as that shown in FIG. 19, the explanation of the connections will be omitted herein.

EXAMPLE

Figure 22:
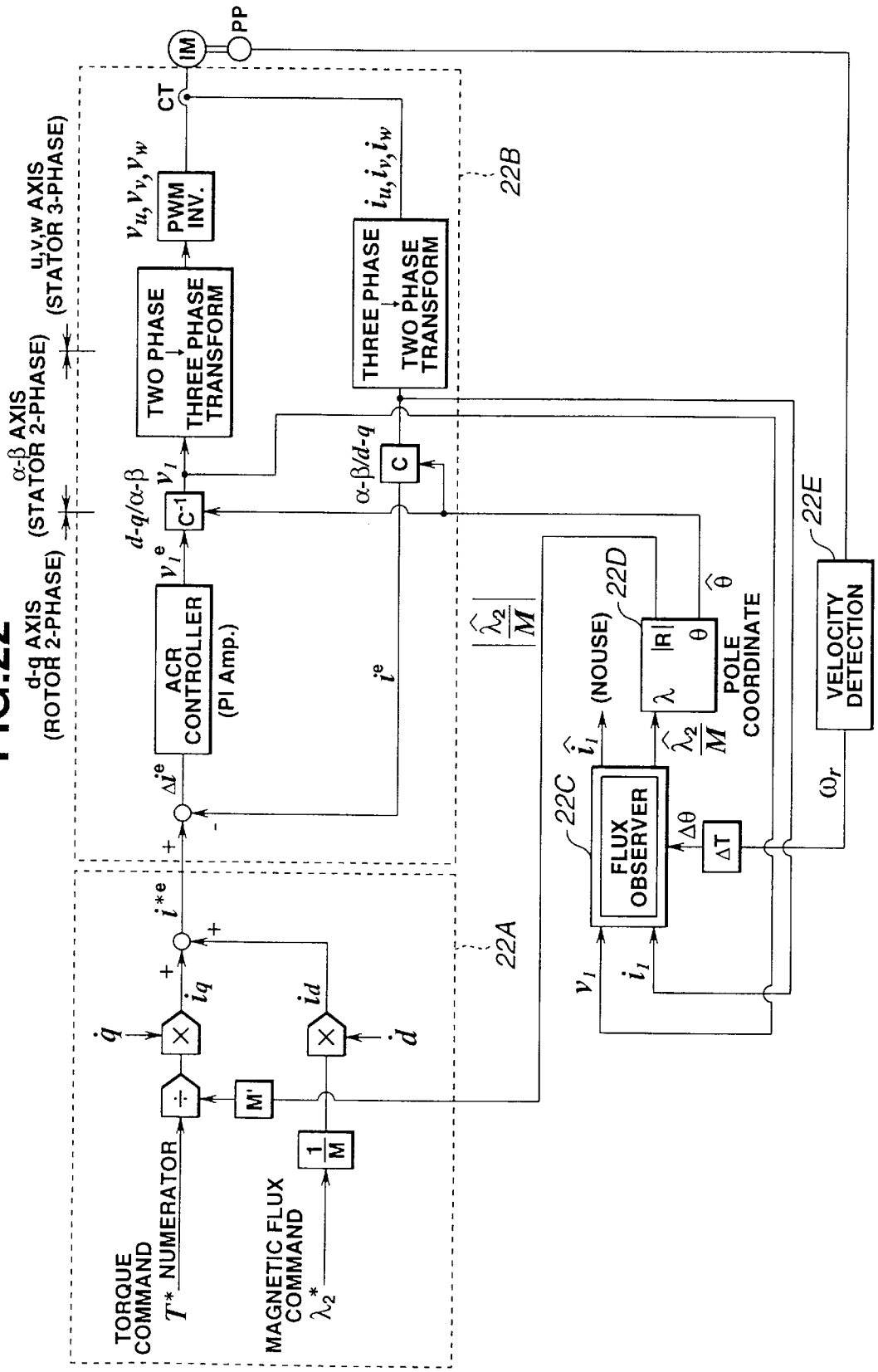
FIG. 22 is a circuit block diagram of an example of the vector control apparatus to which the magnetic flux observer described in each embodiment is applicable.

FIG. 22 shows an example of the vector control apparatus for the induction motor (IM) to which the magnetic flux observer of the full order described in each of the first, second, third, fourth, and fifth embodiments is applicable.

That is to say, a block 22C corresponds to the magnetic flux observer of the full order shown in, e.g., any one of FIGS. 7, 9, 10, 11, 12, 13, 14, 19, 20, and 21.

A block 22D denotes a pole coordinate transform block. In the block 22D, |R| denotes a magnitude of the vector, $\theta$ denotes a phase angle of the vector R with respect to the $\alpha$ axis, and $\lambda$ denotes an input vector. The estimated phase $\hat{\theta}$ of the pole coordinate transform block 22D is supplied to each of d-q axis to $\alpha$-$\beta$ axis transform block denoted by C in a current control section 22B. The term of $|\hat{\lambda}_2/M|$ from the pole coordinate transform block 22D is supplied to a denominator of a divider of a current command calculation section via an M' coefficient block. A numerator of the divider denoted by÷receives a torque command T*. 1/M coefficient block receives a secondary magnetic flux command $\lambda_2^*$.

A multiplier denoted by x connected between the divider÷and an adder in the section 22A receives a q-axis unit vector to output a q-axis current vector iq.

Another multiplier denoted by x connected between 1/M coefficient block and the adder in the section 22A receives an d-axis unit vector to output an d-axis current vector id to the adder.

The adder in the section 22A supplies a current command vector $i^{*e}$ to a plus input end of a subtraction in the section 22B. It is noted that a superscript e denotes the rotary (rotor) coordinate system. The subtractor in the section 22B outputs $\Delta i^e$ to an ACR controller (proportional-integration amplifier). C denotes the coordinate transform matrix and $C^{-1}$ denotes the inverse coordinate transform matrix.

A two-phase-to-three-phase transform block is connected to a PWM (Pulse Width Modulation) type inverter main circuit. Three phase currents iu, iv, and iw detected by a current transformer CT are supplied to a three-phase-to-two-phase transform block to output the primary current vector $i_1$. The $\alpha$-$\beta$ axis-to-d-q axis transform block supplies $i^e$ vector to the subtractor. A pulse encoder PP is connected to the induction motor IM and a velocity detection block 22E outputs the rotation velocity of $\omega r$ to $\Delta T$ coefficient block to output $\Delta \theta$.

Another example of the vector control apparatus is exemplified by a U.S. Pat. No. 5,431,081 issued on Aug. 23, 1994, the disclosure of which is herein incorporated by reference.

The vector control apparatus including the magnetic flux observer of the full order shown in each embodiment may have other variations than that shown in FIG. 22.

It is noted that if the detected rotation velocity of $\omega r$ is replaced with $\hat{\omega} r$ recited in the equation (7) in TABLE 7, the pulse encoder PP and the velocity detector inputted to the magnetic flux observer of the full order shown in FIG. 22 may be eliminated.

TABLE 1

$$\frac{d}{dt}\begin{pmatrix} i_1 \\ \lambda_2 \end{pmatrix} = \begin{pmatrix} a_{r11}I & a_{r12}I + a_{i12}J \\ a_{r21}I & a_{r22}I + a_{i22}J \end{pmatrix}\begin{pmatrix} i_1 \\ \lambda_2 \end{pmatrix} + \begin{pmatrix} b_1 I \\ 0 \end{pmatrix} \cdot v_1 \quad \ldots (1)$$

TABLE 2

$$\alpha_{r11} = -\left(\frac{R_1}{\sigma L_1} + \frac{(1-\sigma)}{\sigma \tau_2}\right) \quad \ldots (2\text{-}1)$$

$$\alpha_{r12} = \frac{M}{\sigma L_1 L_2} \frac{1}{\tau_2} \quad \ldots (2\text{-}2)$$

$$\alpha_{i12} = -\frac{M}{\sigma L_1 L_2} \omega_r \quad \ldots (2\text{-}3)$$

$$\alpha_{r21} = \frac{M}{\tau_2} \quad \ldots (2\text{-}4)$$

$$\alpha_{r22} = -\frac{1}{\tau_2} \quad \ldots (2\text{-}5)$$

$$\alpha_{i11} = \omega_r \quad \ldots (2\text{-}6)$$

$$b_1 = \frac{1}{\sigma L_1} \quad \ldots (2\text{-}7)$$

$$\sigma = 1 - \frac{M^2}{L_1 L_2} \quad \ldots (2\text{-}8),$$

$$\tau_2 = \frac{L_2}{R_2} \quad \ldots (2\text{-}9)$$

$$I = \begin{pmatrix} 1 & 0 \\ 0 & 1 \end{pmatrix} \quad \ldots (2\text{-}10),$$

$$J = \begin{pmatrix} 0 & -1 \\ 1 & 0 \end{pmatrix} \quad \ldots (2\text{-}11)$$

TABLE 3

$i_1 = i_\alpha \cdot \beta + i_\beta \cdot \beta$: primary current component
$v_1 = v_\alpha \cdot \beta + v_\beta \cdot \beta$: primary voltage component
$\lambda_2 = \lambda_\alpha \cdot \beta + \lambda_\beta \cdot \beta$: secondary magnetic flux component  $\ldots (3)$

TABLE 4

$$\frac{d}{dt}\begin{pmatrix}\hat{i}_1 \\ \hat{\lambda}_2\end{pmatrix} = \begin{pmatrix}\alpha_{r11}I & \alpha_{r12}I + \alpha_{i12}J \\ \alpha_{r21}I & \alpha_{r22}I + \alpha_{i22}J\end{pmatrix}\begin{pmatrix}\hat{i}_1 \\ \hat{\lambda}_2\end{pmatrix} + \begin{pmatrix}b_1I \\ 0\end{pmatrix} \cdot v_1 + \begin{pmatrix}g_1I + g_2J \\ g_3I + g_4J\end{pmatrix}(\hat{i}_1 - i_1) \quad \ldots (4)$$

TABLE 5

$g_1 = (k-1)(\alpha_{r11} + \alpha_{r22})$  $\ldots (5\text{-}1)$
$g_2 = (k-1)(\alpha_{i22})$  $\ldots (5\text{-}2)$
$g_3 = (k^2-1)(-c \cdot \alpha_{r11} + \alpha_{r21}) + c \cdot (k-1)(\alpha_{r11} + \alpha_{r22})$  $\ldots (5\text{-}3)$
$g_4 = (k-1)c \cdot (\alpha_{i22})$  $\ldots (5\text{-}4)$ $$c = -\frac{\sigma L_1 L_2}{M} \quad \ldots (5\text{-}5)$$

TABLE 6

$e_{i\alpha} = i_{i\alpha} - \hat{i}_{i\alpha}$  $\ldots (6\text{-}1)$
$e_{i\beta} = i_{i\beta} - \hat{i}_{i\beta}$  $\ldots (6\text{-}2)$

TABLE 7

$$\hat{\omega}_r = K_p \cdot (e_{1\alpha} \cdot \hat{\lambda}_{2\beta} - e_{1\beta} \cdot \hat{\lambda}_{2\alpha}) + K_i \cdot \int (e_{1\alpha} \cdot \hat{\lambda}_{2\beta} - e_{1\beta} \cdot \hat{\lambda}_{2\alpha}) \cdot dt \quad \ldots (7)$$

TABLE 8

$$M' = \frac{M^2}{L_2}, \quad \ldots (8\text{-}1)$$

$$R'_2 = \left(\frac{M}{L_2}\right)^2 \cdot R_2 \quad \ldots (8\text{-}2)$$

$$\sigma = 1 - \frac{M^2}{L_1 L_2}, \quad \ldots (8\text{-}3)$$

$$L_\sigma = \sigma L_1 = L_1 - \frac{M^2}{L_2}, \tau_2 = \frac{L_2}{R_2} \quad \ldots (8\text{-}4)$$

TABLE 9

$$\alpha_{r11} = -\left(\frac{R_1}{\sigma L_1} + \frac{(1-\sigma)}{\sigma \tau_2}\right) \quad \ldots (9\text{-}1)$$

$$= -\left(\frac{R_1}{L_\sigma} + \frac{1 - \left(1 - \frac{M^2}{L_1 L_2}\right)}{\left(1 - \frac{M^2}{L_1 L_2}\right)\tau_2}\right) = -\left(\frac{R_1}{L_\sigma} + \frac{\left(\frac{M^2}{L_1 L_2}\right)}{\left(1 - \frac{M^2}{L_1 L_2}\right)\tau_2}\right)$$

$$= -\left(\frac{R_1}{L_\sigma} + \frac{\left(\frac{M^2}{L_2}\right)}{\left(L_1 - \frac{M^2}{L_2}\right)\frac{R'_2}{M'}}\right) = -\left(\frac{R_1}{L_\sigma} + \frac{M'}{L_\sigma}\frac{R'_2}{M'}\right)$$

$$= -\left(\frac{R_1}{L_\sigma} + \frac{R'_2}{L_\sigma}\right)$$

$$\alpha_{r12} = \frac{M}{\sigma L_1 L_2} \frac{1}{\tau_2} = \frac{M}{\left(1 - \frac{M^2}{L_1 L_2}\right)L_1 L_2} \frac{1}{\tau_2} \quad \ldots (9\text{-}2)$$

$$= \frac{M}{\left(L_1 - \frac{M^2}{L_2}\right)L_2} \frac{1}{\tau_2}$$

$$= \frac{1}{L_\sigma} \frac{M}{L_2} \frac{1}{\tau_2}$$

$$\alpha_{i12} = -\frac{M}{\sigma L_1 L_2} \omega_r = -\frac{M}{\left(1 - \frac{M^2}{L_1 L_2}\right)L_1 L_2} \omega_r = -\frac{M}{\left(L_1 - \frac{M^2}{L_2}\right)L_2} \omega_r \quad \ldots (9\text{-}3)$$

$$= -\frac{1}{L_\sigma} \frac{M}{L_2} \omega_r$$

$$\alpha_{r21} = \frac{M}{\tau_2} \quad \ldots (9\text{-}4)$$

$$\alpha_{r22} = -\frac{1}{\tau_2} \quad \ldots (9\text{-}5)$$

$$\alpha_{i22} = \omega_r \quad \ldots (9\text{-}6)$$

TABLE 9-continued $$b_1 = \frac{1}{\sigma L_1} = \frac{1}{L_\sigma} \qquad \ldots (9\text{-}7)$$

TABLE 10

$$g_1 = (k-1)(\alpha_{r11} + \alpha_{r22}) \qquad \ldots (10\text{-}1)$$
$$= (k-1)\left(-\frac{1}{L_\sigma}(R_1 + R_2') - \frac{1}{\tau_2}\right)$$

$$g_2 = (k-1)(\alpha_{i22}) \qquad \ldots (10\text{-}2)$$
$$= (k-1)(\omega_r)$$

$$\ldots (10\text{-}4)$$
$$g_3 = (k^2 - 1)(-c \cdot \alpha_{r11} + \alpha_{r21}) + c \cdot (k-1)(\alpha_{r11} + \alpha_{r22})$$
$$= (k^2 - 1)\left(-\frac{-\sigma L_1 L_2}{M} \cdot \left\{-\frac{1}{L_\sigma}(R_1 + R_2')\right\} + \frac{M}{\tau_2}\right) +$$
$$\frac{-\sigma L_1 L_2}{M} \cdot (k-1)\left(-\frac{1}{L_\sigma}(R_1 + R_2') - \frac{1}{\tau_2}\right)$$
$$= (k^2 - 1)\left(-\frac{L_2}{M} \cdot (R_1 + R_2') + M\frac{R_2}{L_2}\right) + (k-1) \cdot \frac{L_2}{M}\left((R_1 + R_2') + \frac{L_\sigma}{L_2}\right)$$
$$= (k^2 - 1)\frac{L_2}{M}\left(-(R_1 + R_2') + \left(\frac{M}{L_2}\right)^2 R_2\right) + (k-1) \cdot \frac{L_2}{M}\left((R_1 + R_2') \cdot \frac{L_\sigma}{L_2}\right)$$
$$= (k^2 - 1)\frac{L_2}{M}(-R_1) + (k-1) \cdot \frac{L_2}{M}\left((R_1 + R_2') \cdot \frac{L_\sigma}{\tau_2}\right)$$

$$g_4 = (k-1)c \cdot (\alpha_{i22}) \qquad \ldots (10\text{-}5)$$
$$= (k-1)\frac{-\sigma L_1 L_2}{M} \cdot (\omega_r)$$
$$= (k-1)\frac{L_2}{M}(-\omega_r L_\sigma)$$

TABLE 11

$$\frac{d}{dt}\begin{bmatrix}\hat{i}_1\\ \hat{\lambda}_2/M\end{bmatrix} = \begin{bmatrix}\frac{1}{L_\sigma}(R_1 + R_2')I & \frac{1}{L_\sigma}\frac{M^2}{L_2}\left(\frac{1}{\tau_2}I - \omega_r J\right)\\ \frac{1}{\tau_2} & -\left(\frac{1}{\tau_2}I - \omega_r J\right)\end{bmatrix}\begin{bmatrix}\hat{i}_1\\ \hat{\lambda}_2/M\end{bmatrix} + \frac{1}{L_\sigma}\begin{bmatrix}v_1\\ 0\end{bmatrix} + \qquad \ldots (11\text{-}1)$$
$$\begin{bmatrix}-(k-1)\left(\left\{\frac{1}{L_\sigma}(R_1 + R_2') + \frac{1}{\tau_2}\right\}I - \omega_r J\right)\\ -(k-1)L_\sigma\frac{L_2}{M_2}\left(\left\{\frac{1}{L_\sigma}(R_1 + R_2') + \frac{1}{\tau_2}\right\}I - \omega_r J\right) + (k^2-1)\frac{L_2}{M^2}R_1\end{bmatrix}(\hat{i}_1 - i_1)$$

$$\frac{d}{dt}\begin{bmatrix}\hat{i}_1\\ \hat{\lambda}_2/M\end{bmatrix} = \begin{bmatrix}\frac{1}{L_\sigma}(R_1 + R_2')I & \frac{1}{L_\sigma}M'\left(\frac{1}{\tau_2}I - \omega_r J\right)\\ \frac{R_2'}{M'} & -\left(\frac{1}{\tau_2}I - \omega_r J\right)\end{bmatrix}\begin{bmatrix}\hat{i}_1\\ \hat{\lambda}_2/M\end{bmatrix} + \frac{1}{L_\sigma}\begin{bmatrix}v_1\\ 0\end{bmatrix} + \qquad \ldots (11\text{-}2)$$
$$\begin{bmatrix}-(k-1)\frac{1}{L_\sigma}\left((R_1 + R_2')I + L_\sigma\left(\frac{1}{\tau_2}I - \omega_r J\right)\right)\\ (k-1)\frac{1}{M'}\left((R_1 + R_2')I + L_\sigma\left(\frac{1}{\tau_2}I - \omega_r J\right)\right) + (k^2-1)\frac{1}{M'}R_1\end{bmatrix}(\hat{i}_1 - i_1)$$

TABLE 12

$$g_1 = (k-1)\left(-\frac{(R_1 + R_2')}{L_\sigma} - \frac{1}{\tau_2}\right) \qquad \ldots (12\text{-}1)$$

TABLE 12-continued $$g_2 = (k-1)\omega_r \qquad \ldots (12\text{-}2)$$

$$g_3 = (k-1)\frac{1}{M'}\left((R_1 + R_2') + L_\sigma\frac{1}{\tau_2}\right) - (k^2 - 1)\frac{1}{M'}R_1 \qquad \ldots (12\text{-}3)$$

$$g_4 = (k-1)\frac{1}{M'}(-L_\sigma\omega_r) \qquad \ldots (12\text{-}4)$$

What is claimed is:

1. A vector control apparatus for an induction motor comprising:

a) a current command calculating section for receiving a torque command (T*), a magnetic flux command ($\lambda_2$*), and an estimated secondary magnetic flux component($|\hat{\lambda}_2/M|$) and for outputting a primary current command vector ($i_1^{*e}$) according to the torque command, the magnetic flux command, and the estimated secondary magnetic flux component;

b) a current controlling section for receiving the primary current command vector from the current command calculating section, for detecting a primary current vector ($i_1$) flowing through the induction motor, for generating a primary voltage vector ($v_1$) according to a deviation between the primary current command vector and the primacy current vector, and for outputting the primary current vector to the induction motor according to the generated primacy voltage vector; and, c) a magnetic flux observer of a full order for receiving the primary voltage vector and the primary current vector from the current controlling section and for generating a vector variable ($\hat{\lambda}_2$ or $\hat{\lambda}_2/M$) related to the estimated secondary magnetic flux component to be supplied to the current command calculating section and related to an estimated rotation phase ($\hat{\theta}$) of a rotary coordinate system to be supplied to the current controlling section based on the primary voltage vector and the primary current vector, the magnetic flux observer of the full order having a plurality of coefficients expressed in circuit constants of a T-I type equivalent circuit of the induction motor.

2. A vector control apparatus for an induction motor as claimed in claim 1, which further comprises a velocity determinator for determining a rotation velocity (ωr) of a rotor of the induction motor and outputting the determined velocity of the rotor to the magnetic flux observer of the full order wherein the magnetic flux observer of the full order is based on a state equation as follows:

$$\frac{d}{dt}\begin{bmatrix}\hat{i}_1\\\hat{\lambda}_2\end{bmatrix}=\begin{bmatrix}\alpha_{r11}I & \alpha_{r12}I+\alpha_{i12}J\\\alpha_{r21}I & \alpha_{r22}I+\alpha_{i22}J\end{bmatrix}\begin{bmatrix}\hat{i}_1\\\hat{\lambda}_2\end{bmatrix}+$$

$$\begin{bmatrix}b_1 I\\0\end{bmatrix}\cdot v_1+\begin{bmatrix}g_1 I+g_2 J\\g_3 I+g_4 J\end{bmatrix}(\hat{i}_1-i_1)$$

wherein $\alpha r_{11}=-(R_1/L\sigma+R_2'/L\sigma)$, $\alpha r_{12}=1/L\sigma\ {}^*M/L_2{}^*\omega r$, $\alpha i_{12}=-L\sigma{}^*M/L_2{}^*\omega r$, $\alpha r_{21}=M/\tau_2$, $\alpha r_{22}=-1/\tau_2$, $\alpha i_{22}=\omega r$, $b_1=1/\sigma L_1=1/L\sigma$,
$g_1=(k-1)[-1/L\sigma{}^*(R_1+R_2')-1/\tau_2]$,
$g_2=(k-1)(\omega r)$,
$g_3=(k^2-1)L_2/M(-R_1)+(k-1){}^*L_2/M[(R_1+R_2')+L\sigma/\tau_2]$,
$g_4=(k-1)L_2/M(-r{}^*L\sigma)$, and wherein $R_1$ denotes a primary resistance of the T-I type equivalent circuit to the induction motor, $R_2'=(M/L_2)^2{}^*R_2$, wherein M denotes an exciting impedance in a T type equivalent circuit, $L_2$ denotes a secondary inductance, and $R_2$ denotes a secondary resistance, $L\sigma=\sigma L_1=L_1-M^2/L_2$ wherein $\sigma=1-M^2/L_1 L_2$, wherein $L_1$ denotes a primary inductance, and $\tau=L_2/R_2$.

3. A vector control apparatus for an induction motor as claimed in claim 1, wherein the magnetic flux observer of the full order is based on a state equation expressed as follows:

$$\frac{d}{dt}\begin{bmatrix}\hat{i}_1\\\frac{\hat{\lambda}_2}{M}\end{bmatrix}=\begin{bmatrix}\frac{1}{L_\sigma}(R_1+R_2')I & \frac{1}{L_\sigma}M'\left(\frac{1}{\tau_2}I-\omega_r J\right)\\\frac{R_2'}{M'} & -\left(\frac{1}{\tau_2}I-\omega_r J\right)\end{bmatrix}\begin{bmatrix}\hat{i}_1\\\frac{\hat{\lambda}_2}{M}\end{bmatrix}+\frac{1}{L_\sigma}\begin{bmatrix}v_1\\0\end{bmatrix}+$$

$$\begin{bmatrix}-(k-1)\frac{1}{L_\sigma}\left((R_1+R_2')I+L_\sigma\left[\frac{1}{\tau_2}I-\omega_r J\right]\right)\\(k-1)\frac{1}{M'}\left((R_1+R_2')I+L_\sigma\left(\frac{1}{\tau_2}I-\omega_r J\right)\right)+(k^2-1)\frac{1}{M'}R_1\end{bmatrix}(\hat{i}_1-i_1)$$

wherein $g_1=(k-1)[-1/L\sigma{}^*(R_1+R_2')-1/\tau_2]$,
$g_2=(k-1)(\omega r)$,
$g_3=(k-1)1/M'[(R_1+R_2')+L\sigma{}^*1/\tau_2]-(k^2-1)1/M'{}^*R_1$,
$g_4=(k-1)/M'(-\omega r L\sigma)$, wherein M' denotes an exciting impedance in the T-I type equivalent circuit, and wherein the estimated secondary magnetic flux component ($\hat{\lambda}_2$) of the magnetic flux observer of the full order in the state equation is changed to an estimated exciting current component ($\hat{\lambda}_2/M$).

4. A vector control apparatus for an induction motor as claimed in claim 2, wherein the estimated magnetic flux ($\hat{\lambda}_2$) of the magnetic flux observer of the full order is changed to an exciting current component ($\hat{\lambda}_2/M$) and a part of a secondary circuit of the T-I equivalent circuit of the induction motor is transformed into a rotary coordinate system.

5. A vector control apparatus for an induction motor as claimed in claim 4, wherein the estimated magnetic flux observer includes a secondary voltage vector ($v_2$) in the T-I type equivalent circuit divided by an iron loss resistance (Rn) to derive an iron loss current component (iRn) in a steady state term, the iron loss component being subtracted from the primary current vector and being transferred into a secondary current vector of the T-I type equivalent circuit.

6. A vector control apparatus for an induction motor as claimed in claim 3, wherein the estimated magnetic flux observer includes a secondary voltage vector ($v_2$) in the T-I type equivalent circuit divided by an iron loss resistance (Rn) to derive an iron loss current component (iRn) in a steady state term, the iron loss component being subtracted from the primary current vector and being transferred into a secondary current vector of the T-I type equivalent circuit.

7. A vector control apparatus for an induction motor as claimed in claim 2, wherein the magnetic flux observer of the full order includes: a) a first subtractor (S64) for receiving the primary voltage vector ($v_1$) at its plus input end; b) a second subtractor (S69) for receiving the primary current vector ($i_1$) at its minus input end and receiving an estimated primary current ($\hat{i}_1$) to output a subtraction result of ($\hat{i}_1-i_1$) thereof; c) a first adder (S65) for adding an output subtraction result of the first subtractor (S64) to a first coefficient of $R_2'$ from a first coefficent block (19O); d) a third subtractor (S66) for receiving an output addition result of the first adder at its plus input end and receiving a second coefficient of ($R_{1+R2}'$) at its minus input end from a second coefficient block (19B) to output a subtraction result thereof; e) a second adder (S67) for adding the subtraction result of the third subtractor to a third coefficient of M from a third coefficient block (19I) to output an addition result thereof to a fourth coefficient block (19H); f) a third adder (S68) for adding a fourth coefficient ($\Delta T/L\sigma$), wherein $\Delta T$ denotes a sampling period of the magnetic flux observer from the fourth coefficient block to a $z^{-1}$ operator from a $z^{-1}$ operator block (19I), wherein $z^{-1}$ denotes a z transform operator and a superscript of $-1$ denotes a delay corresponding to the sampling period, to output an addition result thereof to an input end of the $z^{-1}$ operator block and to the estimated primary current output end ($\hat{i}_1$); g) a fourth adder (S73) for adding the first coefficient of ($R_1+R_2'$) from a fifth coefficient block (19C) connected with the output subtraction result of the second subtractor to a fifth coefficient of $(1/\tau\ 2^*\ \omega r J)L\sigma$ from a sixth coefficient block (19D) to output an addition result thereof; h) a fourth subtractor (S70) for receiving a sixth coefficent of $(k-1)$, wherein k denotes a constant used to multiply poles that the induction motor inherently has, at its plus end thereof and receiving an output of a coefficient of $R_1{}^*(k^2-1)$ from a combination of a seventh coefficient block (19G) of ($k^2-1$) and an eighth coefficient block (19F) of $R_1$ connected with the output subtraction result of the second subtractor (S69) to output a subtraction result ($\Delta v_2$) thereof; h) a fifth adder (S71) for adding the subtraction result ($\Delta v_2$) from the fourth subtractor (S70) to a seventh coefficient of $R_2'$ from a ninth coefficient block (19A) connected to the estimated primary current output end ($\hat{i}_1$); i) a fifth subtractor (S72) for receiving the addition result of the fifth adder at its plus input end and receiving the first coefficient ($R_2'$) from the first coefficient block at its minus input end to output a subtraction result thereof to an eighth coefficient of $1/M'$, wherein $M'=M^2/L_2$ and M' denotes an exciting impedance in the T-I type equivalent circuit, from a tenth coefficient block (19L); j) a sixth subtractor (S75) for receiving an output of a rotary coordinate transform matrix block (19M) at is plus input end and receiving a first input of the rotary coordinate transform matrix block (19M) at its minus input end to output a subtraction result thereof to the second adder (S67) via a coefficient block (19J) of M; k) a sixth adder (S74) for adding the output of the rotary coordinate transform matrix block (19M) and the eighth coefficient of 1/M' from the tenth coefficient block (19L) to output its addition result as ($\hat{\lambda}_2$/M; 1) another $z^{-1}$ operator block (19P) connected between the input end of the rotary coordinate transform matrix block (19M) and both of the output addition result of the sixth adder (S74) and the first coefficient block (19O); and m) an eleventh coefficient block (19E) of (k−1) connected between the output addition result of the fourth adder (S73) and both of a minus input end of the first subtractor (S64) and a plus input end of the fourth subtractor (S70), a second input end of the rotary coordinate transform matrix block (19M) receiving a rotation phase angle of $\Delta\theta$ from a block (19N) of the rotation velocity ($\omega r$) expressed as $\Delta\theta = \omega r^* \Delta T$.

8. A vector control apparatus for an induction motor as claimed in claim 2, wherein the magnetic flux observer of the full order includes: a) a first subtractor (S64) for receiving the primary voltage vector ($v_1$) at its plus input end; b) a second subtractor (S69) for receiving the primary current vector ($i_1$) at its minus input end and receiving an estimated primary current ($\hat{i}_1$) to output a subtraction result of ($\hat{i}_1 - i_1$) thereof; c) a first adder (S65) for adding an output subtraction result of the first subtractor (S64) to a first coefficient of $R_2'$ from a first coefficient block (19O); d) a third subtractor (S66) for receiving an output addition result of the first adder at its plus input end and receiving a second coefficient of ($R_1 + R_2'$) at its minus input end from a second coefficient block (19B) to output a subtraction result thereof; e) a second adder (S67) for adding the subtraction result of the third subtractor to a third coefficient of M from a third coefficient block (19I) to output an addition result thereof to a fourth coefficient block (19H); f) a third adder (S68) for adding a fourth coefficient ($\Delta T/L\sigma$), wherein $\Delta T$ denotes a sampling period of the magnetic flux observer from the fourth coefficient block to a $z^{-1}$ operator from a $z^{-1}$ operator block (19I), wherein $z^{-1}$ denotes a z transform operator and a superscript of −1 denotes a delay corresponding to the sampling period, to output an addition result thereof to an input end of the $z^{-1}$ operator block and to the estimated primary current output end ($\hat{i}_1$); g) a fourth adder (S73) for adding the first coefficient of ($R_1 + R_2'$) from a fifth coefficient block (19C) connected with the output subtraction result of the second subtractor to a fifth coefficient of ($1/\tau 2^* \omega r J$)L$\sigma$ from a sixth coefficient block (19D) to output an addition result thereof; h) a fourth subtractor (S70) for receiving a sixth coefficient of (k−1), wherein k denotes a constant used to multiply poles that the induction motor inherently has, at its plus end thereof and receiving an output of a coefficient of $R_1^*(k^2-1)$ from a combination of a seventh coefficient block (19G) of ($k^2-1$) andaneighthcoefficient block (19F) of $R_1$ connected with the output subtraction result of the second subtractor (S69) to output a subtraction result ($\Delta v_2$) thereof; h) a fifth adder (S71) for adding the subtraction result ($\Delta v_2$) from the fourth subtractor (S70) to a seventh coefficient of $R_2'$ from a ninth coefficient block (19A) connected to the estimated primary current output end ($\hat{i}_1$); i) a fifth subtractor (S72) for receiving the addition result of the fifth adder at its plus input end and receiving the first coefficient ($R_2'$) from the first coefficient block at its minus input end to output a subtraction result thereof to an eighth coefficient of 1/M', wherein M'=$M^2/L_2$ and M' denotes an exciting impedance in the T-I type equivalent circuit, from a tenth coefficient block (19L); j) a sixth subtractor (S75) for receiving an output of a rotary coordinate transform matrix block (19M) at is plus input end and receiving a first input of the rotary coordinate transform matrix block (19M) to output a subtraction result thereof to the second adder (S67) via a coefficient block (19J) of M; k) a sixth adder (S76) for adding another $z^{-1}$ operator of another $z^{-1}$ operator block (19P) and the eighth coefficient of 1/M' from the tenth coefficient block (19L) to output its addition result to a minus input end of the sixth subtractor (S75) and the first input end of the rotary coordinate transform matrix block (19M); 1) the other $z^{-1}$ operator block (19P) connected between both of the output end of the rotary coordinate transform matrix block (19M) and the $\hat{\lambda}_2$/M output end and both of the plus input end of the sixth adder (S76) and the first coefficient block (19O); and m) an eleventh coefficient block (19E) of (k−1) connected between the output addition result of the fourth adder (S73) and both of a minus input end of the first subtractor (S64) and a plus input end of the fourth subtractor (S70), a second input end of the rotary coordinate transform matrix block (19M) receiving a rotation phase angle of $\Delta\theta$ from a block (19N) of the rotation velocity ($\omega r$) expressed as $\Delta\theta = \omega r^* \Delta T$.

9. A vector control apparatus for an induction motor as claimed in claim 2, wherein the magnetic flux observer of the full order includes: a) a first subtractor (S64) for receiving the primary voltage vector ($v_1$) at its plus input end; b) a second subtractor (S69) for receiving the primary current vector ($i_1$) at its minus input end and receiving an estimated primary current ($\hat{i}_1$) to output a subtraction result of ($\hat{i}_1 - i_1$) thereof; c) a first adder (S65) for adding an output subtraction result of the first subtractor (S64) to a first coefficient of $R_2'$ from a first coeffcent block (19O); d) a third subtractor (S66) for receiving an output addition result of the first adder at its plus input end and receiving a second coefficient of ($R_1 + R_2'$) at its minus input end from a second coefficient block (19B) to output a subtraction result thereof; e) a second adder (S67) for adding the subtraction result of the third subtractor to a third coefficient of M from a third coefficient block (19I) to output an addition result thereof to a fourth coefficient block (19H); f) a third adder (S68) for adding a fourth coefficient ($\Delta T/L\sigma$), wherein $\Delta T$ denotes a sampling period of the magnetic flux observer from the fourth coefficient block to a $z^{-1}$ operator from a $z^{-1}$ operator block (19I), wherein $z^{-1}$ denotes a z transform operator and a superscript of −1 denotes a delay corresponding to the sampling period, to output an addition result thereof to an input end of the $z^{-1}$ operator block and to the estimated primary current output end ($\hat{i}_1$); g) a fourth adder (S73) for adding the first coefficient of ($R_1 + R_2'$) from a fifth coefficient block (19C) connected with the output subtraction result of the second subtractor to a fifth coefficient of ($1/\tau 2^* \omega r J$)L$\sigma$ from a sixth coefficient block (19D) to output an addition result thereof; h) a fourth subtractor (S70) for receiving a sixth coeffcent of (k−1), wherein k denotes a constant used to multiply poles that the induction motor inherently has, at its plus end thereof and receiving an output of a coefficient of $R_1^*(k^2-1)$ from a combination of a seventh coefficient block (19G) of ($k^2-1$) and an eighth coefficient block (19F) of $R_1$ connected with the output subtraction result of the second subtractor (S69) to output a subtraction result ($\Delta v_2$) thereof; h) a fifth adder (S71) for adding the subtraction result ($\Delta v_2$) from the fourth subtractor (S70) to a seventh coefficient of $R_2'$ from a ninth coefficient block (19A) connected to the estimated primary current output end ($\hat{i}_1$); i) a fifth subtractor (S72) for receiving the addition result of the fifth adder at its plus input end and receiving the first coefficient ($R_2'$) from the first coefficient block at its minus input end to output a subtraction result thereof to an eighth coefficient of 1/M', wherein M'=$M^2/L_2$ and M' denotes an exciting impedance in the T-I type equivalent circuit, from a tenth coefficient block (19L); j) a sixth subtractor (S75) for receiving an output of a rotary coordinate transform matrix block (19M) at is plus input end and receiving a first input of the rotary coordinate transform matrix block (19M) at its minus input end to output a subtraction result thereof to the second adder (S67) via a coefficient block (19J) of M; k) a sixth adder (S77) for adding the output of the rotary coordinate transform matrix block (19M) and the eighth coefficient of 1/M' from the tenth coefficient block (19L) via a first weight block (21C) of (1-α), wherein a denotes a weight coefficient and 0≦α≦0, to output its addition result as $\hat{\lambda}_2/M$; 1) a seventh adder (S76) for adding the eighth coefficient of 1/M' from the tenth coefficient block (19L) via a second weight block (21A) of α and the z −1 operator from another z −1 operator block (19P) to output its addition result to the first input end of the rotary coordinate transform block (19M); m) the other $z^{-1}$ operator block (19P) connected between the output addition result of the seventh adder (S76) which is the $\hat{\lambda}_2/M$ output end and both of the plus input end of the sixth adder (S76) and the first coefficient block (19O) of $R_2'$; and n) an eleventh coefficient block (19E) of (k−1) connected between the output addition result of the fourth adder (S73) and both of a minus input end of the first subtractor (S64) and a plus input end of the fourth subtractor (S70), a second input end of the rotary coordinate transform matrix block (19M) receiving a rotation phase angle of Δθ from a block (19N) of the rotation velocity (ωr) expressed as Δθ=ωr* ΔT.

10. A vector control apparatus for an induction motor as claimed in claim 9, wherein the rotary coordinate transform matrix block (19M) is expressed as:

$$\begin{bmatrix} \cos\Delta\theta & -\sin\Delta\theta \\ \sin\Delta\theta & \cos\Delta\theta \end{bmatrix}.$$

11. A vector control apparatus for an induction motor as claimed in claim 10, which further comprises a pole coordinate transform block (22D) which receives the $\hat{\lambda}2/M$ output from the magnetic flux observer of the full order at its λ input end, outputs the secondary magnetic flux component of $|\hat{\lambda}_2/M|$ at its |R| output end to the current command calculating section (22A), and outputs an estimated rotation phase ($\hat{\theta}$) to the current controlling section (22B).

12. A vector control method for an induction motor, the vector control method comprising the steps of:

a) receiving a torque command (T*), a magnetic flux command ($\lambda_2$*), and an estimated secondary magnetic flux component($|\hat{\lambda}_2/M|$);

b) outputting a primary current command vector ($i_1^{*e}$) according to the torque command, the magnetic flux command, and the estimated secondary magnetic flux component;

c) receiving the primary current command vector;

d) detecting a primary current vector ($i_1$) flowing through the induction motor, for generating a primary voltage vector ($v_1$) according to a deviation between the primary current command vector and the primacy current vector;

e) outputting the primary current vector to the induction motor according to the generated primacy voltage vector;

f) providing a magnetic flux observer of a full order for receiving the primary voltage vector and the primary current vector and for generating a vector variable ($\hat{\lambda}_2$ or $\hat{\lambda}_2/M$) related to the estimated secondary magnetic flux component and related to an estimated rotation phase ($\hat{\theta}$) of a rotary coordinate system based on the primary voltage vector and the primary current vector, the magnetic flux observer of the full order having a plurality of coefficients expressed in circuit constants of a T-I type equivalent circuit of the induction motor.

* * * * *